United States Patent
Chandler et al.

(10) Patent No.: US 10,346,198 B1
(45) Date of Patent: Jul. 9, 2019

(54) DATA PROCESSING ARCHITECTURE FOR IMPROVED DATA FLOW

(71) Applicant: Avodah Labs, Inc., Arlington, TX (US)

(72) Inventors: Trevor Chandler, Thornton, CO (US); Dallas Nash, Frisco, TX (US); Michael Menefee, Richardson, TX (US)

(73) Assignee: AVODAH LABS, INC., Arlington, TX (US)

( * ) Notice: Subject to any disclaimer, the term of this patent is extended or adjusted under 35 U.S.C. 154(b) by 0 days.

(21) Appl. No.: 16/258,524

(22) Filed: Jan. 25, 2019

Related U.S. Application Data

(60) Provisional application No. 62/629,398, filed on Feb. 12, 2018, provisional application No. 62/660,739, filed on Apr. 20, 2018, provisional application No. 62/693,841, filed on Jul. 3, 2018.

(51) Int. Cl.
| | |
|---|---|
| *G06F 9/46* | (2006.01) |
| *G06F 9/48* | (2006.01) |
| *G06T 1/20* | (2006.01) |
| *G06F 9/38* | (2018.01) |
| *G06N 3/08* | (2006.01) |
| *G06F 3/01* | (2006.01) |
| *G06N 20/00* | (2019.01) |
| *G06K 9/00* | (2006.01) |
| *G06N 3/04* | (2006.01) |

(52) U.S. Cl.
CPC ............ *G06F 9/4806* (2013.01); *G06F 3/011* (2013.01); *G06F 3/017* (2013.01); *G06F 9/3877* (2013.01); *G06K 9/00355* (2013.01); *G06N 3/0454* (2013.01); *G06N 3/08* (2013.01); *G06N 20/00* (2019.01); *G06T 1/20* (2013.01)

(58) Field of Classification Search
None
See application file for complete search history.

(56) References Cited

U.S. PATENT DOCUMENTS

| | | | | |
|---|---|---|---|---|
| 5,704,012 | A * | 12/1997 | Bigus | G06F 9/5011 706/19 |
| 2010/0194679 | A1* | 8/2010 | Wu | G06K 9/00375 345/156 |
| 2016/0379082 | A1* | 12/2016 | Rodriguez | G01C 21/20 382/100 |
| 2017/0206405 | A1* | 7/2017 | Molchanov | G06K 9/00355 |

* cited by examiner

*Primary Examiner* — Bing Zhao
(74) *Attorney, Agent, or Firm* — Perkins Coie LLP

(57) ABSTRACT

Disclosed are methods, apparatus and systems for improving data management and workload distribution in pattern recognition systems. An example method of managing data for a sign language translation system includes receiving multiple sets of data acquired by one or more data acquisition devices. Each set of data including an image frame that illustrates at least a part of a gesture. The method includes determining, for each of the multiple sets of data, a plurality of attribute values defined by a customized template. The method includes accessing the multiple sets of data, by a plurality of processing units, based on a location indicated by the attributes for recognizing the at least a part of a gesture.

6 Claims, 34 Drawing Sheets

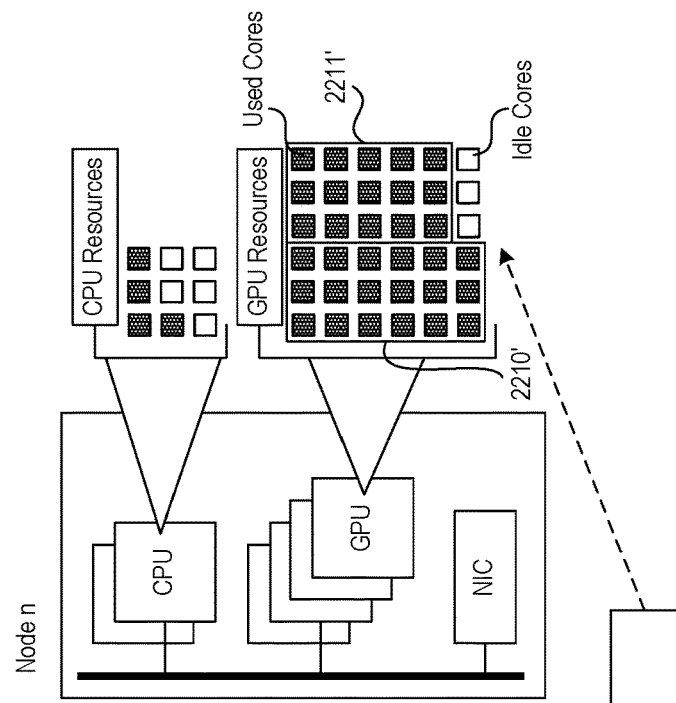
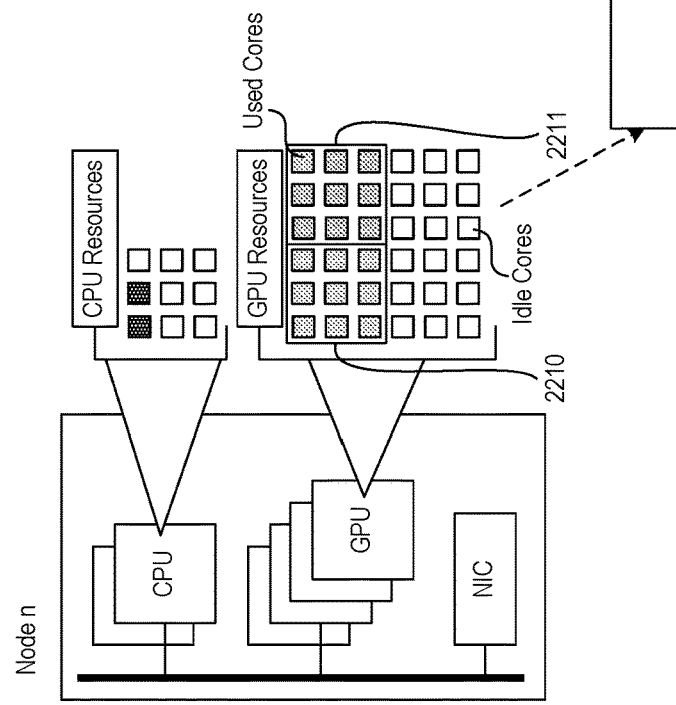
FIG. 22

DATA PROCESSING ARCHITECTURE FOR IMPROVED DATA FLOW

CROSS-REFERENCE TO RELATED APPLICATIONS

This patent document claims priority to and benefits of U.S. Provisional Patent Application No. 62/629,398 entitled "INTERACTIVE AUTOMATED SIGN LANGUAGE TRANSLATION METHOD AND APPARATUS," filed Feb. 12, 2018, U.S. Provisional Patent Application No. 62/660,739 entitled "DATA MANAGEMENT FOR VISUAL SIGN LANGUAGE TRANSLATION," filed Apr. 20, 2018, and U.S. Provisional Patent Application No. 62/693,841 entitled "LOAD BALANCING AND IMPROVED PROCESSING FOR VISUAL SIGN LANGUAGE," and filed Jul. 3, 2018. The entire contents of the before-mentioned patent applications are incorporated by reference as part of the disclosure of this patent document.

TECHNICAL FIELD

This document generally relates to automated pattern and gesture recognition, and more particularly to improving data management and workload distribution of automated pattern and gesture recognition systems that utilize neural networks.

BACKGROUND

Computer vision is an interdisciplinary field that deals with how computers can gain high-level understanding from digital images or videos. Computer vision tasks include methods for acquiring, processing, analyzing and understanding digital images, and extraction of high-dimensional data from the real world in order to produce numerical or symbolic information. From the perspective of engineering, computer vision techniques seek to automate tasks that the human visual system can do, such as pattern recognition for recognizing patterns and regularities in data, and gesture recognition for interpreting human gestures via mathematical algorithms. A variety of information, such as video, audio, still images, etc., is captured as input for pattern and/or gesture recognition applications. Due to the large amount of input data for such systems, efficient data and workload management often becomes a key for ensuring satisfactory performance, particularly for applications that require real-time feedback and/or responses.

One specification application of automated pattern and gesture recognition is sign language translation. A sign language (also known as a signed language) is a language that uses manual communication to convey meaning, ideas and thoughts, which simultaneously employs hand gestures, movement, orientation of the fingers, arms or body, and facial expressions to convey a speaker's ideas. Data and workload management techniques enable more efficient utilization of computational resources and operations of various components within a sign language translation system, thereby facilitating automated translation of sign languages in real time.

SUMMARY

Disclosed are devices, systems and methods for improving data management and workload distribution for a pattern and/or gesture recognition system that processes a large amount of data in real-time. The disclosed techniques can be applied in various embodiments, such as interactive automated sign language translation and communication, to provide reduce or eliminate unnecessary data transfers and/or conversions. The techniques can also be implemented to achieve more efficient workload distribution for real-time performance.

In one example aspect, an apparatus in a sign language processing system includes a plurality of processing units, a non-transitory memory including instructions stored thereupon, and a shared memory accessible to the plurality of processing units. The instructions upon execution by a first processing unit of the plurality processing units cause the first processing unit to receive multiple sets of data acquired by one or more data acquisition devices. Each set of data including an image frame that illustrates at least a part of a gesture, wherein the gesture represents a letter, a word, or a phrase in a sign language. The instructions also cause the first processing unit to determine, for each of the multiple sets of data, a plurality of attribute values defined by a customized template. The customized template uniformly defines a plurality of attributes for all sets of data captured by the one or more data acquisition devices including a first attribute that indicates a location of the shared memory for storage of the corresponding set of data and a second attribute that indicates when the corresponding gesture is captured. The instructions upon execution by a second processing unit of the plurality of processing units cause the second processing unit to access the multiple sets of data in the shared memory using the location indicated by the first attribute without copying the multiple sets of data to any other memory location.

In another example aspect, a method of managing data for a sign language translation system includes receiving multiple sets of data acquired by one or more data acquisition devices. Each set of data including an image frame that illustrates at least a part of a gesture, wherein the gesture represents a letter, a word, or a phrase in a sign language. The method includes determining, for each of the multiple sets of data, a plurality of attribute values defined by a customized template. The customized template uniformly defines a plurality of attributes for all sets of data captured by the one or more data acquisition devices including a first attribute that indicates a location of the shared memory for storage of the corresponding set of data and a second attribute that indicates when the corresponding gesture is captured. The method includes accessing the multiple sets of data, by a plurality of processing units, based on the location indicated by the first attribute for recognizing the at least a part of a gesture. The location allows at least one of the plurality of processing units to access the multiple sets of data in the shared memory without copying the multiple sets of data to any other memory location.

In another example aspect, an apparatus in a sign language processing system includes a first processing unit and a second processing unit, and a memory including instructions stored thereupon. The instructions upon execution by the first processing unit cause the first processing unit to receive, by a first thread of a first processing unit, a set of data captured by a capture device, the set of data including an image frame that illustrates a gesture representing a letter, a word, or a phrase in a sign language. The instructions upon execution cause the first processing unit to eliminate, by the first thread of the first processing unit, background information in the image frame to obtain one or more areas of interest; prepare, by a second thread of the first processing unit concurrently as the set of data is preprocessed, a set of resources for a gesture recognition operation; invoke, by the second thread of the first processing unit, a first neural network to be executed on a second processing unit to carry out the gesture recognition operation on the one or more areas of interest using the set of resources; and receive, by the first thread of the first processing unit, a subsequent set of data captured by the capture device, the subsequent set of data received concurrently as the gesture recognition operation is being performed. The instructions upon execution by the first or the second processing unit cause the first or the second process unit to determine a performance result of the gesture recognition operation, and dynamically adjust the set of resources for subsequent processing of data from the capture device to improve the performance result.

In another example aspect, a method for improving computational efficiency of a computer system for use in a sign language translation system includes receiving, by a first thread of a first processing unit, a set of data captured by a capture device, the set of data including an image frame that illustrates a gesture representing a letter, a word, or a phrase in a sign language. The method includes eliminating, by the first thread of the first processing unit, background information from the image frame to obtain one or more areas of interest; preparing, by a second thread of the first processing unit concurrently as the set of data is preprocessed, a set of resources for a gesture recognition operation; invoking, by the second thread of the first processing unit, a first neural network to be executed on a second processing unit to carry out the gesture recognition operation on the one or more areas of interest using the set of resources; receiving, by the first thread of the first processing unit, a subsequent set of data captured by the capture device concurrently as the gesture recognition operation is being performed; determining a performance result of the gesture recognition operation; and dynamically adjusting the set of resources for subsequent processing of data from the capture device to improve the performance result.

In yet another example aspect, an apparatus of a pattern recognition system includes a first processing unit and a second processing unit, a shared memory accessible to at least the second processing unit, and a non-transitory memory including instructions stored thereupon. The instructions upon execution by the first processing unit cause the first processing unit to receive, by a first thread of the first processing unit, a set of data captured by a capture device. The instructions upon execution cause the first processing unit to determine, by a second thread of the first processing unit, a plurality of attribute values defined by a customized template. The customized template uniformly defines a plurality of attributes for all sets of data captured by the one or more data acquisition devices including a first attribute that indicates a location of the shared memory for storage of the set of data and a second attribute that indicates when the corresponding gesture is captured. The instructions upon execution by the second processing unit cause the second processing unit to execute a first neural network to carry out a recognition operation using a set of resources. The instructions upon execution by the first or the second processing unit cause the first processing unit or the second processing unit to dynamically adjust the set of resources for subsequent processing of data from the capture device to improve a system unitization rate.

These and other features of the disclosed technology are described in the present document.

BRIEF DESCRIPTION OF THE DRAWINGS

FIG. 22 illustrates an example of a load balancing module that dynamically schedules resources on multiple processing nodes in accordance with an example embodiment of the disclosed technology.

DETAILED DESCRIPTION

Figure 1:
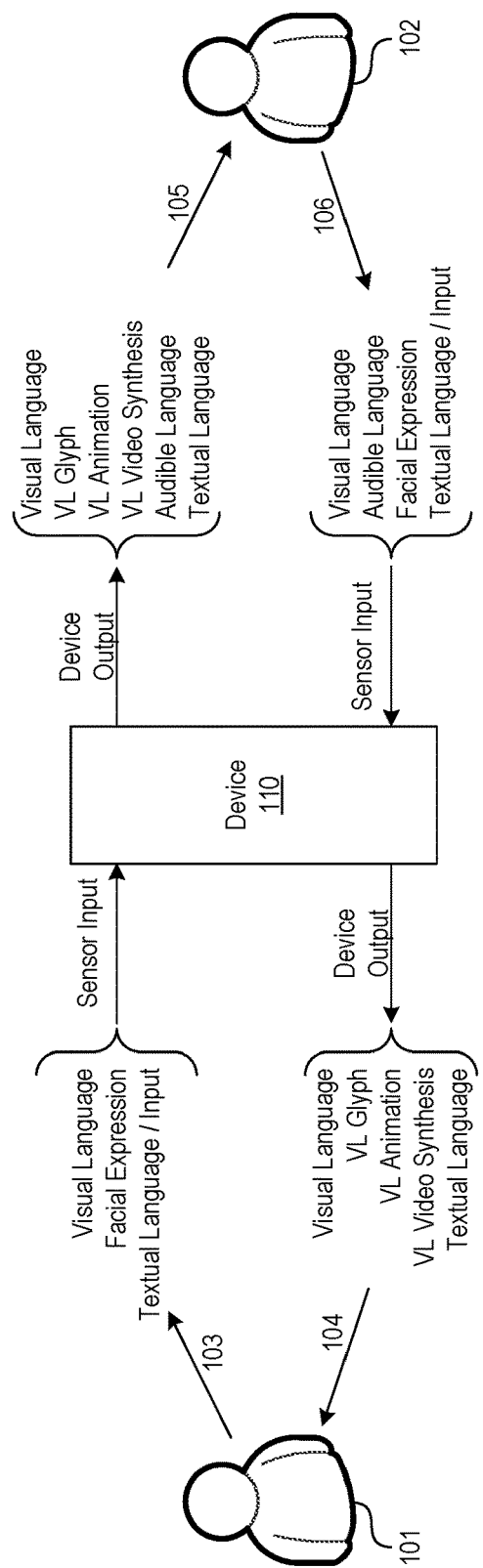
FIG. 1 illustrates a two-way translation system used by two parties in accordance with an example embodiment of the disclosed technology.

Pattern recognition is the automated recognition of patterns and regularities in data. Gesture recognition focuses on a specific type of pattern: gestures, which can originate from any bodily motion or state. Pattern and gesture recognitions are closely related to artificial intelligence and machine learning. In machine learning, pattern and gesture recognition is accomplished by assigning labels to images, or more generally, to inputs, which allows the input to be recognized through the use of artificial intelligence systems. For example, in sign language translation systems, gestures are captured as input images. The images are then processed (e.g., removing background pixels, performing image segmentation, and/or matching the segments with signs stored in a database) to recognize what the gestures indicate. In many pattern recognition applications, a large amount of input data (e.g., input images) is processed through the artificial intelligence system. To provide real-time performance, multiple processing cores and/or units are often used. Data management (such as minimizing data transfers across processing units and data format conversions) as well as workload management (such determining the appropriate amount of work to be distributed across various processing cores) are key to the performance of the system.

One specific application of using the neural networks for pattern and gesture recognition is sign language translation. Sign languages are extremely complex. In general, sign languages do not have any linguistic relation to the spoken languages of the lands in which they arise. The correlation between sign and spoken languages is complex and varies depending on the country more than the spoken language. For example, the US, Canada, UK, Australia and New Zealand all have English as their dominant language, but American Sign Language (ASL), used in the US and English-speaking Canada, is derived from French Sign Language whereas the other three countries sign dialects of British, Australian, and New Zealand Sign Language (collectively referred to as BANZSL). Similarly, the sign languages of Spain and Mexico are very different, despite Spanish being the national language in each country.

Furthermore, unlike spoken languages, in which grammar is expressed through sound-based signifiers for tense, aspect, mood, and syntax, sign languages use hand movements, sign order, and body and facial cues to create grammar. In some cases, even certain uttered sounds or clicks may form a part of the sign language. Such a cue is referred to as a non-manual activity and can vary significantly across different sign languages. It is desirable for a sign-language translation system to capture and process both the hand movements and the non-manual activities to provide an accurate and natural translation for the parties.

The embodiments of the disclosed technology that are implemented for sign language translation are flexible and adaptable in that an input sign language, which can be any one of a several sign languages, is converted to an internal representation, which can then be used to translate the input sign language into one or more of a variety of output sign languages. Furthermore, the embodiments described in this document employ a multiplicity of different sensors and processing mechanisms to be able to capture and process information that may not be obtainable when a single sensor or process is utilized, and to facilitate accurate capture, processing and interpretation of the information to allow translation between different sign languages. In an example, the Bible may be translated from any language to a particular sign language, or from one sign language representation to another, based on the embodiments disclosed in this document. In general, any textual, audible or sign language content may be translated in real-time to corresponding content in another audible, textual or sign language.

FIGS. 1-10 are illustrations offered to provide the proper context for the specific application of a sign language translation system that can benefit from the data and workload management techniques described in later sections of this document. FIG. 1 illustrates a two-way translation system used by two parties in accordance with an example embodiment of the disclosed technology. As shown in FIG. 1, a device 110 facilitates communication between a first party 101 and a second party 102. The device 110 comprises two sets of sensor inputs and outputs for each of the users. In an example, an outgoing communication of the first party (who may be a sign language user) may be a visual language, a facial expression, or a textual language or input. The device 110 identifies the language used by the first party and translates it into a language understandable by the second party, and outputs it based on a preference of the second party. In another example, as a part of the incoming communication, the device may provide the translated output as a visual language (e.g. another sign language) that may include glyphs, animations or video synthesis (e.g. avatars), or in an audible or textual language.

This process can be inverted by the device in that an outgoing communication of the second party, which now may also be in an audible language, is identified and translated for the first party. The device may output the translation as an incoming communication for the party as a type of visual language or a textual language. The device may input the visual language, audible language, facial expression, or textural language or input as an outgoing communication from the party. In some embodiments, the language choice or preference of either party may be identified by the device. In other embodiments, the language choice or preference may be predetermined or selected in real-time. It is noted that the example system of FIG. 1 allows communications between two sign language users, or a sign language user and a non-sign language user.

Figure 2:
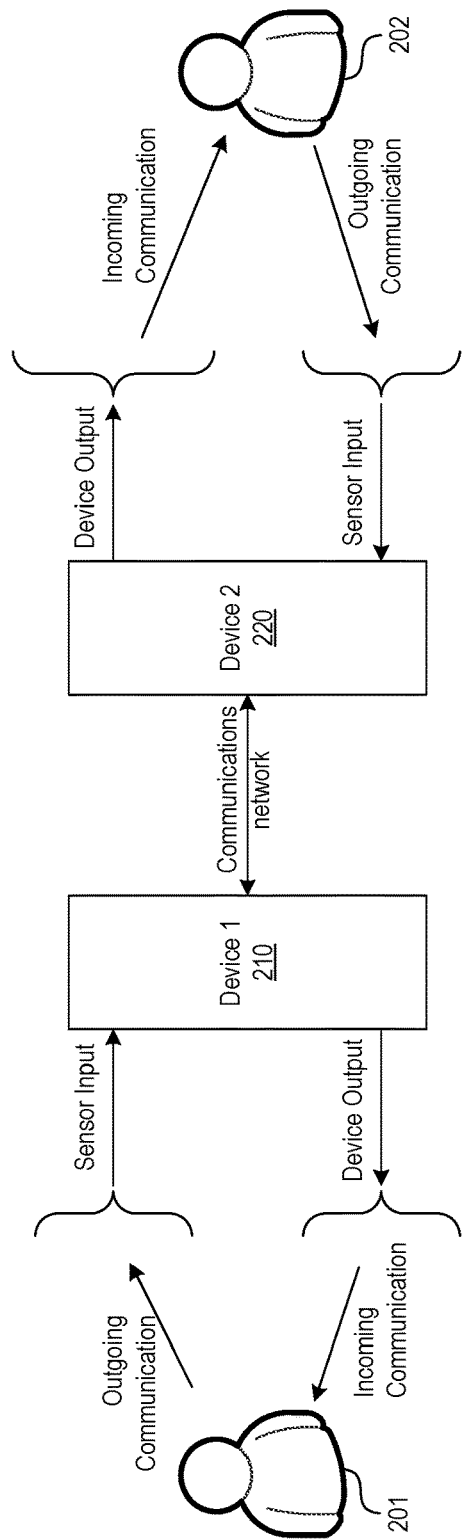
FIG. 2 illustrates a remote two-way translation system used by two parties that may be in different locations over a communication network in accordance with an example embodiment of the disclosed technology.

FIG. 2 illustrates a remote two-way translation system used by two parties that may be in different locations over a communication network in accordance with an example embodiment of the disclosed technology. As shown in FIG. 2, the first party 201 and a second party 202 need not necessarily be co-located as long as they have access to a communication network that allows the exchange of information from one location to another location. In the depicted scenario, two devices 210 and 220 are connected via a communication network, which can be a wired network or a wireless network such as a Wi-Fi network, a personal area network, or a mobile network. As in the case of FIG. 1, the remote two-way translation system allows communications between two sign language users, or a sign language user and a non-sign language user.

Figure 3:
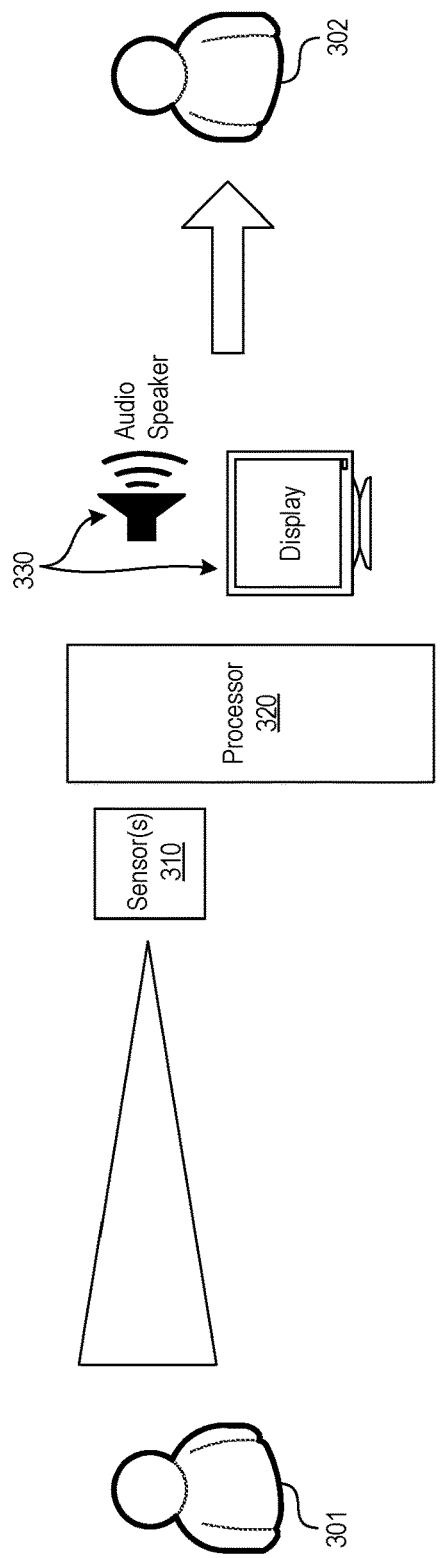
FIG. 3 illustrates a one-way translation system used by two parties in accordance with an example embodiment of the disclosed technology.

FIG. 3 illustrates a one-way translation system used by two parties 301, 302 in accordance with an example embodiment of the disclosed technology. This example includes some features and/or components that are similar to those shown in FIGS. 1-2, and described above, and their description is not repeated. As shown in FIG. 3, one or more sensors 310 capture one or more aspects of the sign language speaker and/or the speaker's environment and generate a digital representation of what is being observed. As will be described in later sections of this document, the one or more sensors 310 can include a variety of audio, video, motion, haptic and other types of sensors. In some embodiments, the video rate of the sensor data capture may be selected based on the sign language input due to the increased complexity of some sign languages. The digital representation of the sign language communication may include at least a part of a gesture, facial cues, body cues, or environmental factors.

The captured information, including the captured video, is then processed by one or more processors 320 to identify the input sign language, recognize individual gestures and other features of the communication, and translate the communication to an internal representation. The internal representation of the sign language communication can then be converted to an appropriate language and/or format and displayed or audibly output in the language of the second party by various output devices 330, such as displays, speakers, and haptic devices. In some embodiments, the second language may be either a predetermined language or selected by the second party. In other embodiments, a second translation or transformation may be performed if it is detected that certain output devices are not present, or if the user selects an alternate output option.

Figure 4:
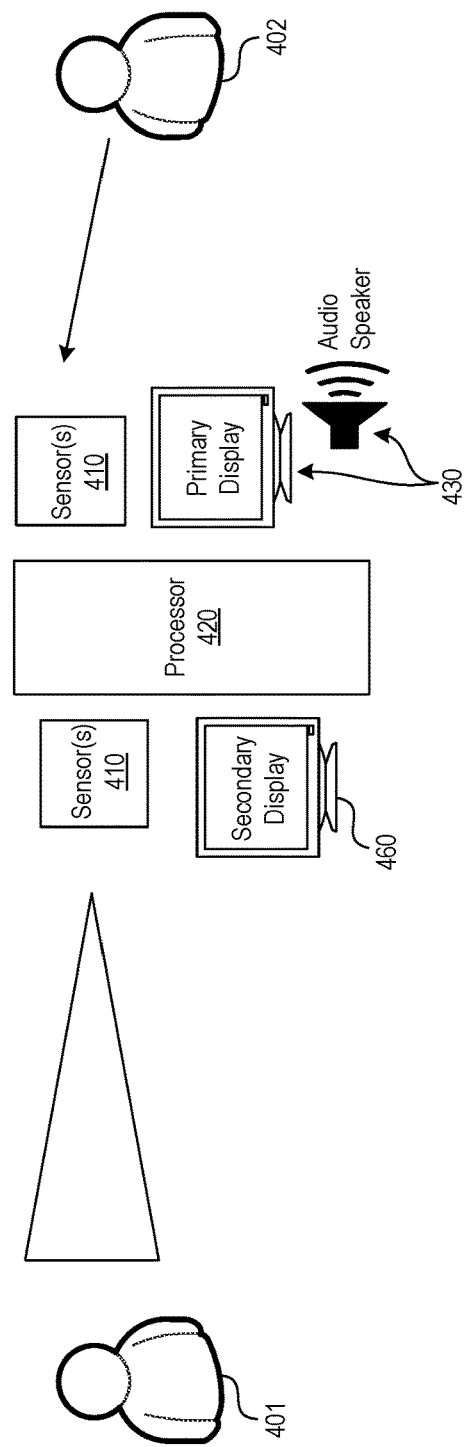
FIG. 4 illustrates another two-way interactive translation system implemented to enable communications by two parties in accordance with an example embodiment of the disclosed technology.

FIG. 4 illustrates another two-way interactive translation system implemented to enable communications by two parties 401, 402 in accordance with an example embodiment of the disclosed technology. As shown in FIG. 4, the translation system includes one or more sensors 410, one or more processors 420, and various output devices that are similar to the components described above, and their description is not repeated. In FIG. 4, the one or more sensors 410 are able to receive audible or physical input from the second party 402, who wishes to communicate with the sign language speaker (the first party 401). In some embodiments, the translation system includes additional input templates, such as a keyboard or a touchscreen, to receive physical input from the second party 402.

The audible or textual input from the second part is processed by the processor and converted to the internal representation. This internal representation of the second party's communication is then translated to the sign language of the first party 401 and displayed via a secondary display 460. In some embodiments, the first party may receive the input as text, graphic (glyph-like) or through an animated figure representation of the second party. In other embodiments, the two-way translation between a sign language and a textual, audible or different sign language may be performed in real-time.

Figure 5:
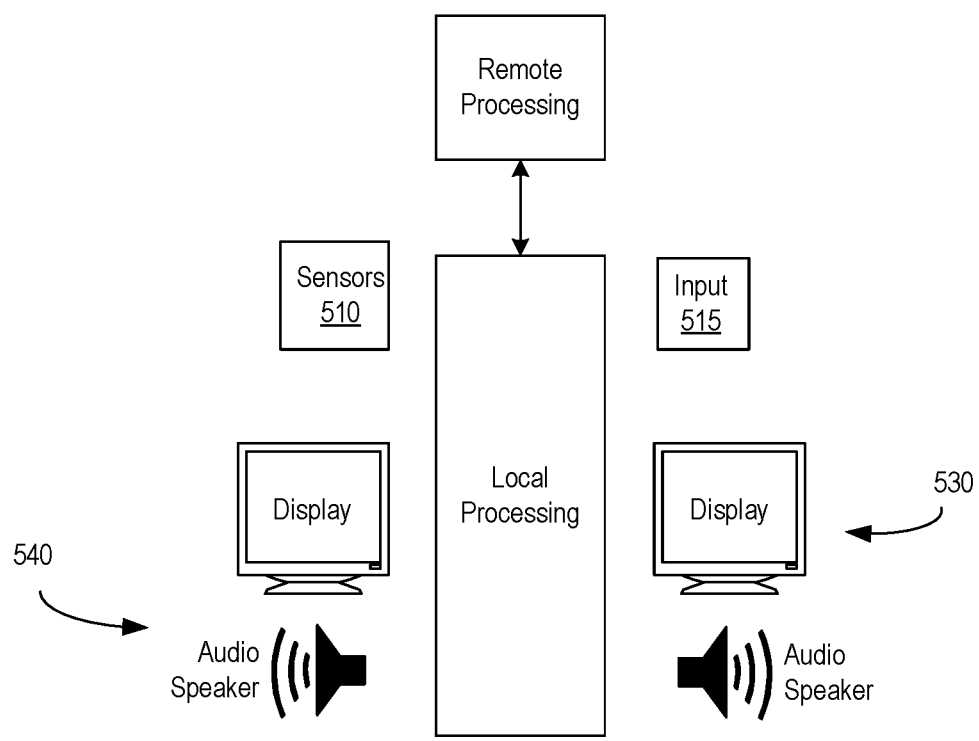
FIG. 5 illustrates a configurable automated translation system in accordance with an example embodiment of the disclosed technology.

FIG. 5 illustrates a configurable automated translation system in accordance with an example embodiment of the disclosed technology. As shown in FIG. 5, embodiments of the disclosed technology may include a number of different visual language sensors 510. In an example, the visual language sensors may include one or more of an RGB color camera, a monochrome camera, a 3D stereo camera, structured light emitter, a 3D processor of structured light, a time-of-flight emitter and camera, a non-visual electromagnetic sensor and a non-visual electro-optical sensor. The system may also include standard input devices 515, e.g. a microphone, a microphone array or 3D microphone, a touchscreen keyboard, or a physical keyboard.

In addition to the input sensors described above, the device includes a host of output capabilities. For example, standard language rendering may be performed using a textual display or a speaker 530. On the other hand, the sign language output may include textual, graphical (glyphs, etc.), animated (virtual hands, avatars, etc.) or synthesized video (from a library of basic visual language gestures) outputs, which can be demonstrated to the user via another textural display or speaker 540.

FIG. 5 also illustrates that the processing of the input language from the first party, and specifically the translation from an input language to the internal representation and subsequently to the language of the second party, can be performed either locally, remotely or both. In some embodiments, the device may have access to cloud computing resources, which may be leveraged in, for example, configurations where many different output sign languages are to be supported.

Figure 6:
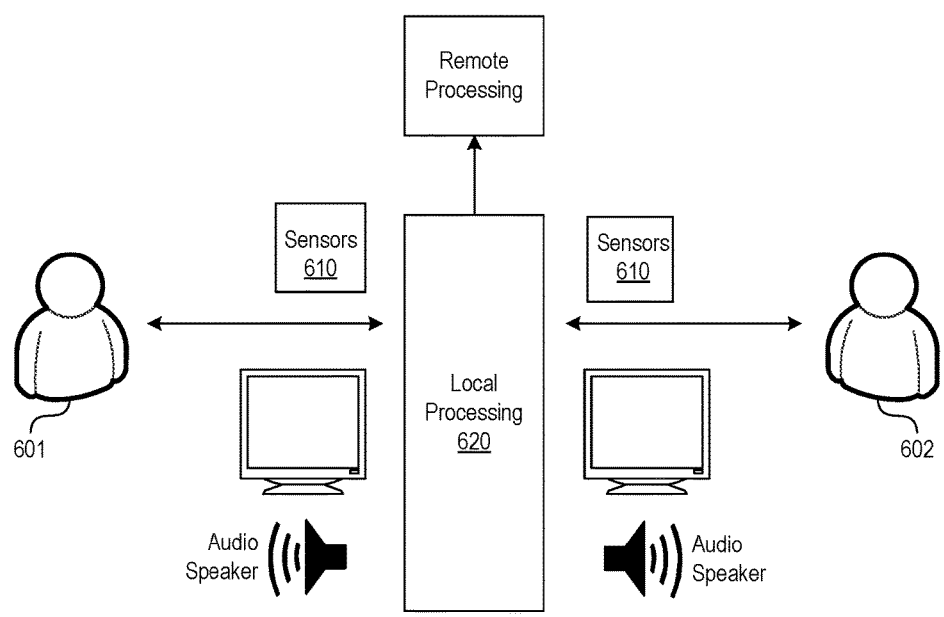
FIG. 6 illustrates another configurable automated translation system in accordance with an example embodiment of the disclosed technology.

FIG. 6 illustrates another configurable automated translation system in accordance with an example embodiment of the disclosed technology. As shown in FIG. 6, the translation system includes one or more sensors 610, one or more processors 620, and various output devices that are similar to the components described in the examples above, and the corresponding description is not repeated. In some embodiments, the first party 601 or the second party 602 is not necessarily a person but could be automata. For example, a sign language user may communicate with a virtual assistant, an interactive response agent, or simply an alert generation mechanism. Embodiments of the disclosed technology are flexible and adaptable to be able to support the translation of languages between sign language users, audible language speakers, and automata, and any combination of the above. In part, this is achieved by translating the input language to an internal representation, and then translating it to the required one or more output languages.

In an example, the Bible may be translated into American Sign Language (ASL) which is one of the most commonly used sign languages. Expert input, e.g. interpretation and context for specific verses or sections, may be used to improve the translation during the training period. The ASL-translated Bible may be then displayed using an avatar in a less commonly used sign language that is not ASL. In some embodiments, both the first and second parties may be sign language users, and furthermore, may not use the same sign language.

Figure 7:
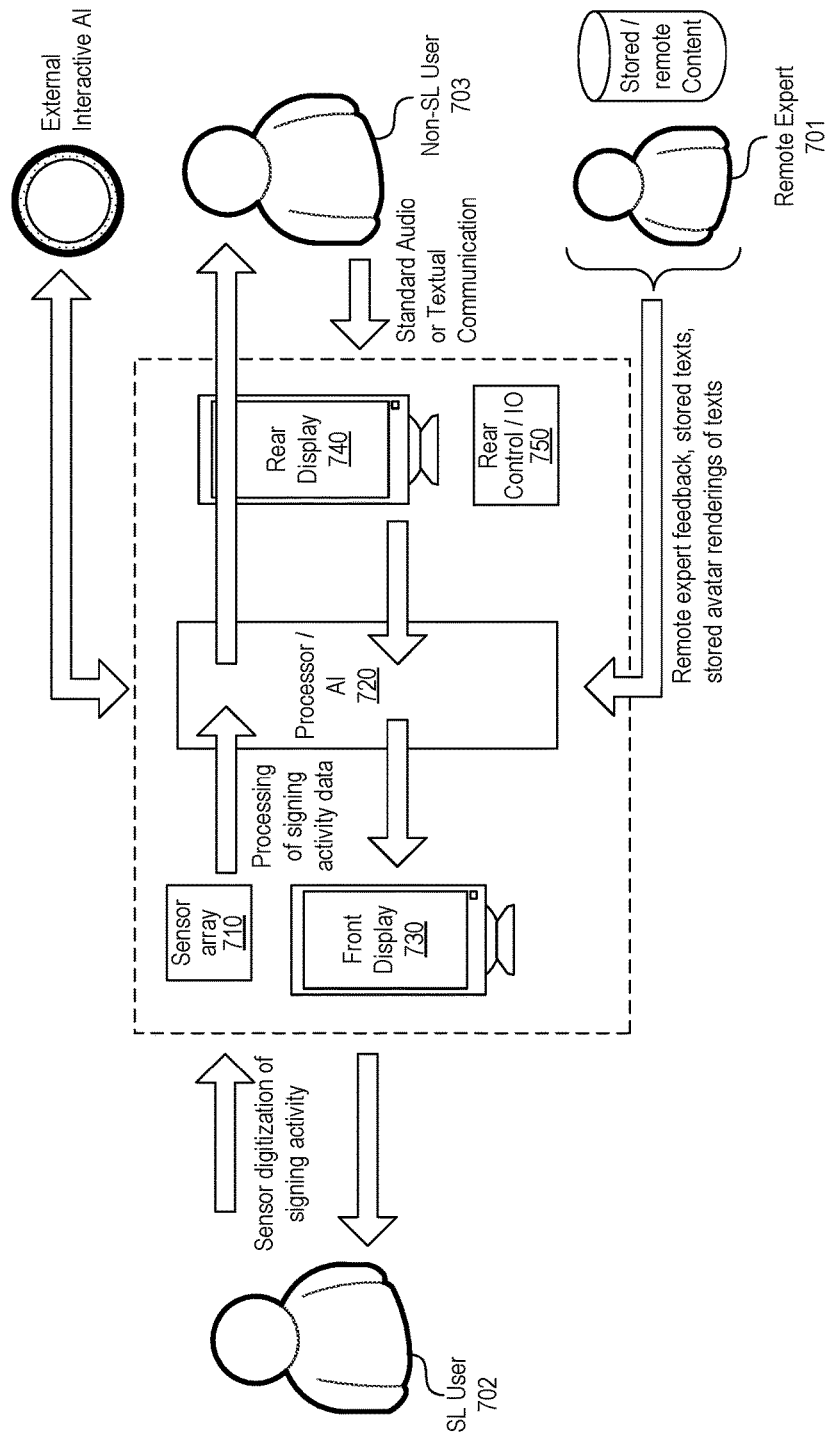
FIG. 7 illustrates yet another configurable automated translation system in accordance with an example embodiment of the disclosed technology.

FIG. 7 illustrates yet another configurable automated translation system in accordance with an example embodiment of the disclosed technology. The automated sign language translation system can be used to translate specific literature or material, e.g. the Bible or works by a particular author. In these scenarios, a remote expert 701 may provide additional context and insight as part of the automated translation process. For example, idiomatic and situational context related to specific content may be used in the training of the neural network and may result in a more natural and useful translation into one of many sign languages.

FIG. 7 illustrates, in part, the digitization of signing activity that is received using a number of sensors 710 that can sense signing activities of a user who uses sign language(s) (also referred to as an SL user 702). The captured data is then fed to one or more processors 720 for processing. Due to the complexity of sign language, and in an effort to support many sign languages, the amount of data that is captured may be prohibitive. Thus, embodiments of the disclosed technology may leverage data that has previously been captured and digitized to reduce the amount of data that needs to be stored when the device is being used in real-time, either locally or in a remote setting. The device then outputs textual or avatar rendering of communication or content to the SL user via the front display 730 of the device.

The device can also include a rear display 740 to show textual or audio communication or content to a user that does not use sign languages (also referred to as a non-SL user 703). The device can receive standard audio or textual communication from the non-SL user and may include a rear control 750 for the non-SL user 703 to control the device.

In some embodiments, the device may be effectively used to perform sign language translations in a remote region, where access to studios and/or more sophisticated computer technology is non-existent or very limited. In an example, a basic corpus of a sign language that is used in a remote area may be used to initially train the neural network and will allow translations upon arrival to that region. After the system is deployed there, the corpus may be expanded exponentially based on input by native sign language users, which will improve the translation capabilities due to iterative training and interpretation (or execution) cycles of the neural network.

Figure 8B:
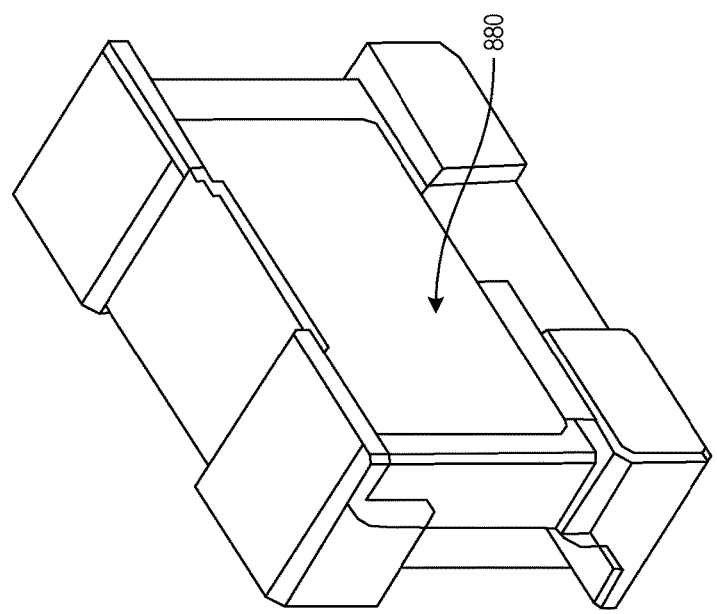
FIG. 8B shows another view of an image capture and processing device that can be used for automated sign language translation in accordance with an example embodiment of the disclosed technology.
Figure 8A:
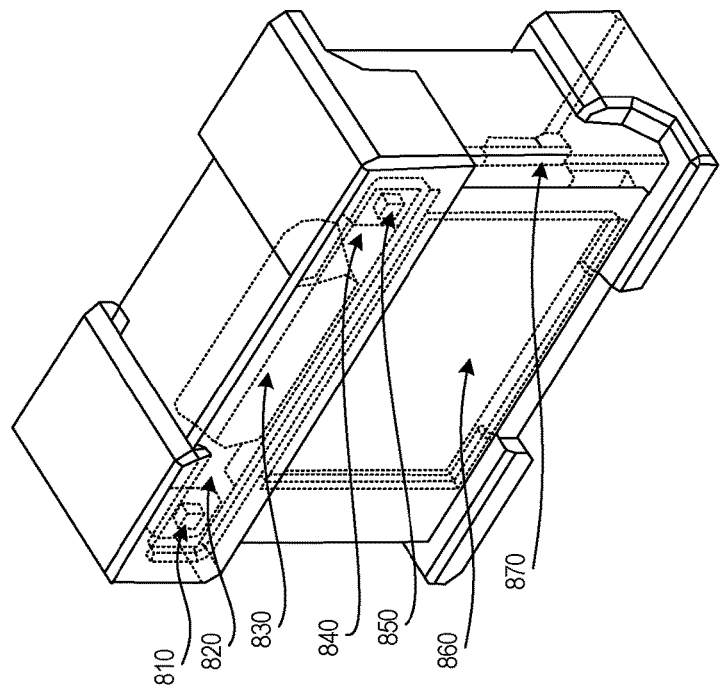
FIG. 8A illustrates one view of an image capture and processing device that can be used for automated sign language translation in accordance with an example embodiment of the disclosed technology.

FIGS. 8A and 8B illustrate different views of an image capture and processing device that can be used for automated sign language translation in accordance with an example embodiment of the disclosed technology. As shown in FIG. 8A, the image capture and processing device may include a right camera 810 and a left camera 850 to be able to capture a moving object or scene (e.g., a sign language speaker) from different points of view, therein increasing the depth of field measurements that enable more accurate interpretation of the scene such as the sign language gestures. Similarly, the inclusion of a right microphone 820 and a left microphone 840 enable different contextual and environmental cues to be captured.

The image capture and processing device further comprises stereo (or 3D) camera 830, a front display 830, and one or more processors 870. In some embodiments, the one or more processors include an ARM Cortext-M3 processor and at least one Graphics Processing Unit (GPU). In other embodiments, and as shown in FIG. 8B, the device may further comprise a rear display 880, which may be a touch-screen display. In some embodiments, the stereo camera 830 may be replaced or augmented by a depth sensor or multi-aperture camera, which may be configured to measure the "depth" or distance from the camera focal baseline to the object corresponding to a particular pixel in the scene.

Figure 9:
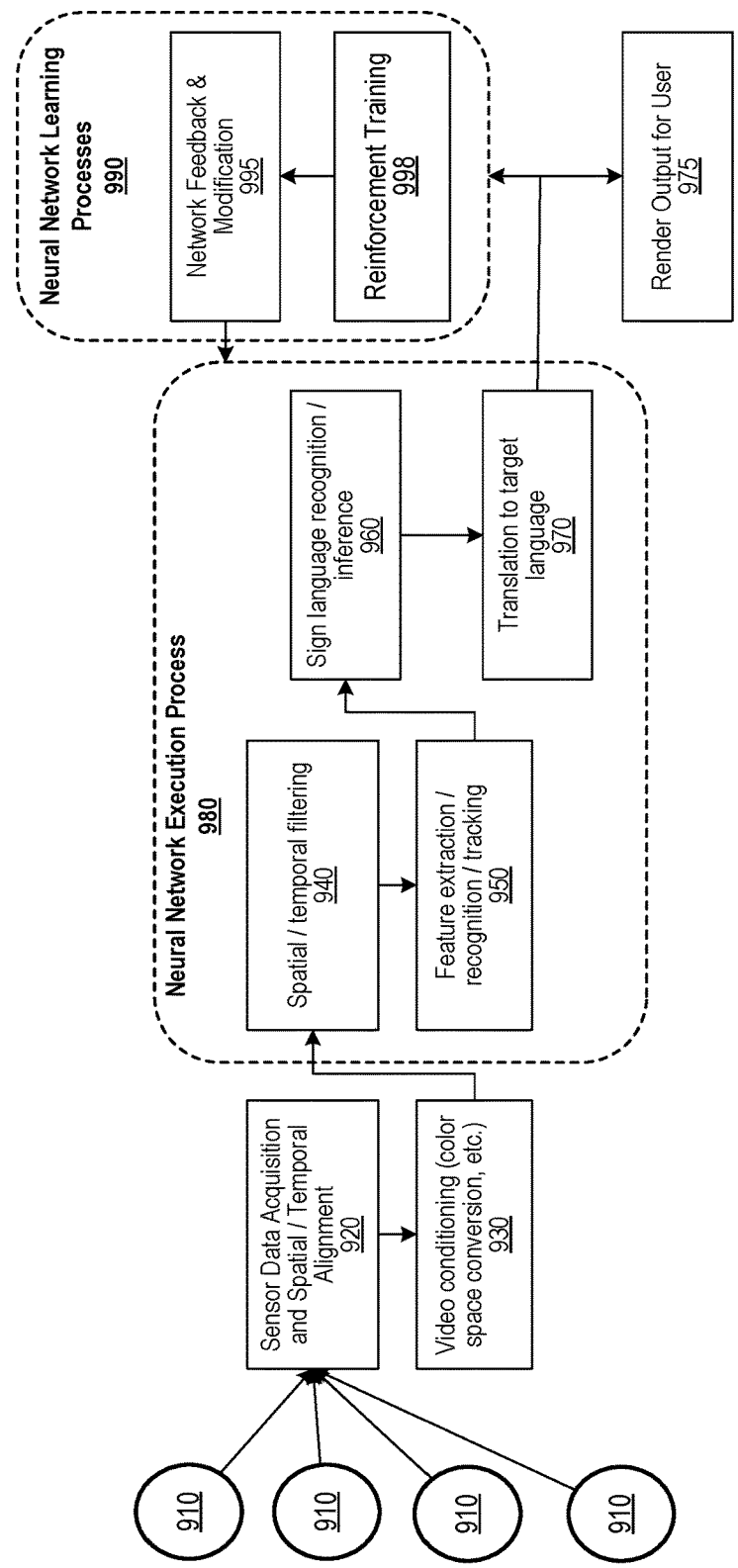
FIG. 9 illustrates a flow diagram of operations that can be carried out by various component to implement automated sign language translation in accordance with an example embodiment of the disclosed technology.

FIG. 9 shows an example flow diagram of operations that can be carried out by various component to implement automated sign language translation in accordance with one or more embodiments of the disclosed technology. This example includes some features and components that are similar to those described above, and their description is not repeated.

As shown in FIG. 9, multiple sensors 910 may each capture a communication of a sign language user. In an example, using multiple sensors enables environmental factors to be acquired, and provides better depth of field measurements of sign language gestures. In some exemplary operations, a set of preprocessing operations can be performed. For example, the input data collected from the multiple sensors is first aligned, in operation 920, both spatially and temporally. For example, based on the video quality and the external lighting and other conditions, video conditioning procedures 930 (e.g. color space conversion) may be implemented. This operation may be followed, for example, by spatial and temporal filtering in operation 940, to reduce the data to a particular resolution, retain data for only a particular spatial zone of interest or a temporal period of interest. The processing may further include the application of image and/or video processing methods, e.g. edge detection, which conditions the data for additional processing.

The conditioned data of the communication from the sign language user can then be processed in operation 950 in order to extract features of gestures, facial cues and body cues, amongst other features that enable the identification of the sign language. The input sign language is translated to an internal representation in operation 960, and subsequently translated to the target language in operation 970. The output is then rendered to the user at operation 975.

In some embodiments, the feature extraction, identification and translation may be part of a neural network execution process 980. Before the neural network starts the execution process, the neural network is trained by the neural network learning process 990. The techniques discussed in later sections of this document can be implemented in the neural network learning process to allow the trained neural network to recognize a large number of characteristics in the input data more efficiency and more accurately. To perform the neural network learning process, a set of training data can be used to carry out training algorithms such as supervised training of the neural network. In some embodiments, as part of feedback for the learning process, the translated sign language is used to further train and modify the neural network, in operation 995, to improve its identification and translation capabilities. In yet other embodiments, reinforcement training 998 of neural networks may be employed to improve performance and increase the flexibility and adaptability of embodiments of the disclosed technology.

Figure 10:
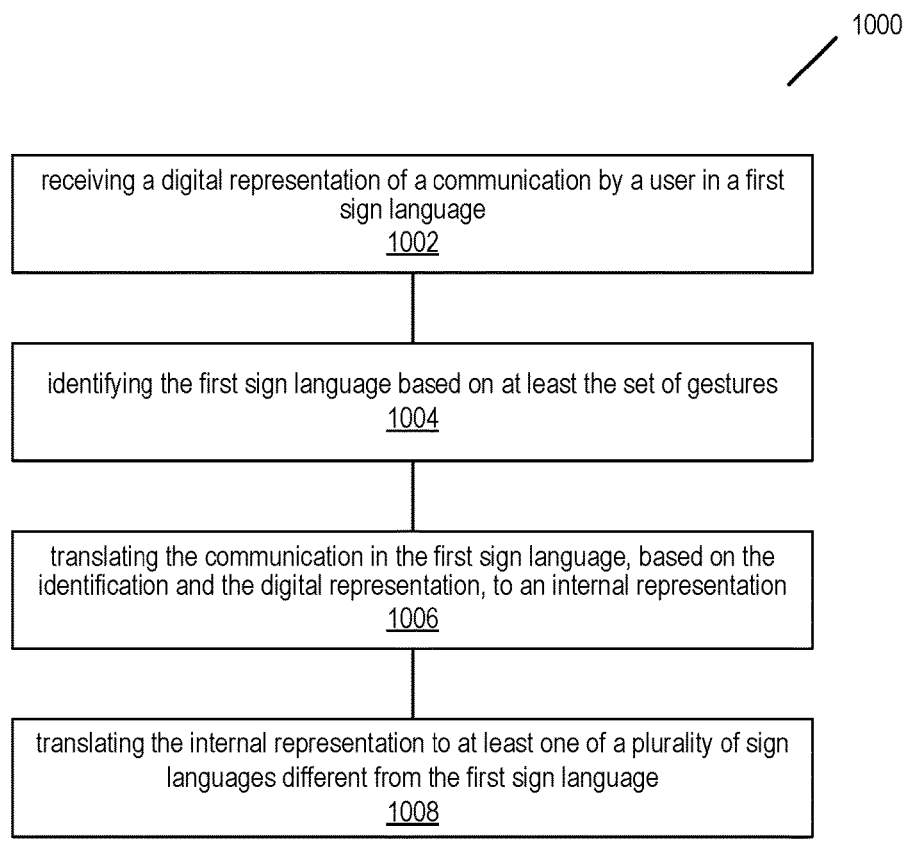
FIG. 10 illustrates a method that includes a set of operations that can be carried out to automate sign language translation in accordance with an example embodiment of the disclosed technology.

FIG. 10 illustrates a method 1000 that includes a set of operations that can be carried out to automate sign language translation in accordance with an example embodiment of the disclosed technology. The method 1000 includes, at operation 1002, receiving a digital representation of a communication by a user in a first sign language. In some embodiments, the digital representation includes a plurality of images. In other embodiments, the digital representation includes a video recording.

The method 1000 includes, at operation 1004, identifying the first sign language based on at least the set of gestures. In some embodiments, identifying the first sign language may be based on a sign language gesture library or sign language content curated by an expert. In an example, the expert content may comprise idiomatic and situational context associated with the first sign language.

The method 1000 includes, at operation 1006, translating the communication in the first sign language, based on the identification and the digital representation, to an internal representation. The method 1000 includes, at operation 1008, translating the internal representation to at least one of a plurality of sign languages different from the first sign language. In some embodiments, the translation may be based on sign language content curated by an expert. For example, and when translating known subject matter (e.g. the Bible) the expert content may be based on existing interpretation and analysis.

In some embodiments, the method may further include receiving a response to the communication, which is translated into the internal representation, and subsequently into the first sign language. Embodiments of the disclosed technology are capable of real-time operation, which is enabled, in part, by the internal representation and the underlying neural network.

As noted earlier, the example configurations in FIGS. 1-10 represent examples of systems that capture a variety of information (e.g., video, audio, still images, etc.) in different modalities (e.g., natural light, structured light, infrared light) of moving and still objects, as well as of the background environment. As a result, a large amount of data is obtained that must undergo further processing and analysis to extract the information of interest. Generation and analysis of large amounts of data are hallmarks of other systems and applications, such as autonomous vehicles and medical applications that involve analysis of medical images (e.g., MRI, X-ray, CT scan, video content, etc.). Additional applications include, but are not limited to, interactive video games, airport security and surveillance applications, analysis and training for various sports, interactive home devices, and others.

Figure 11:
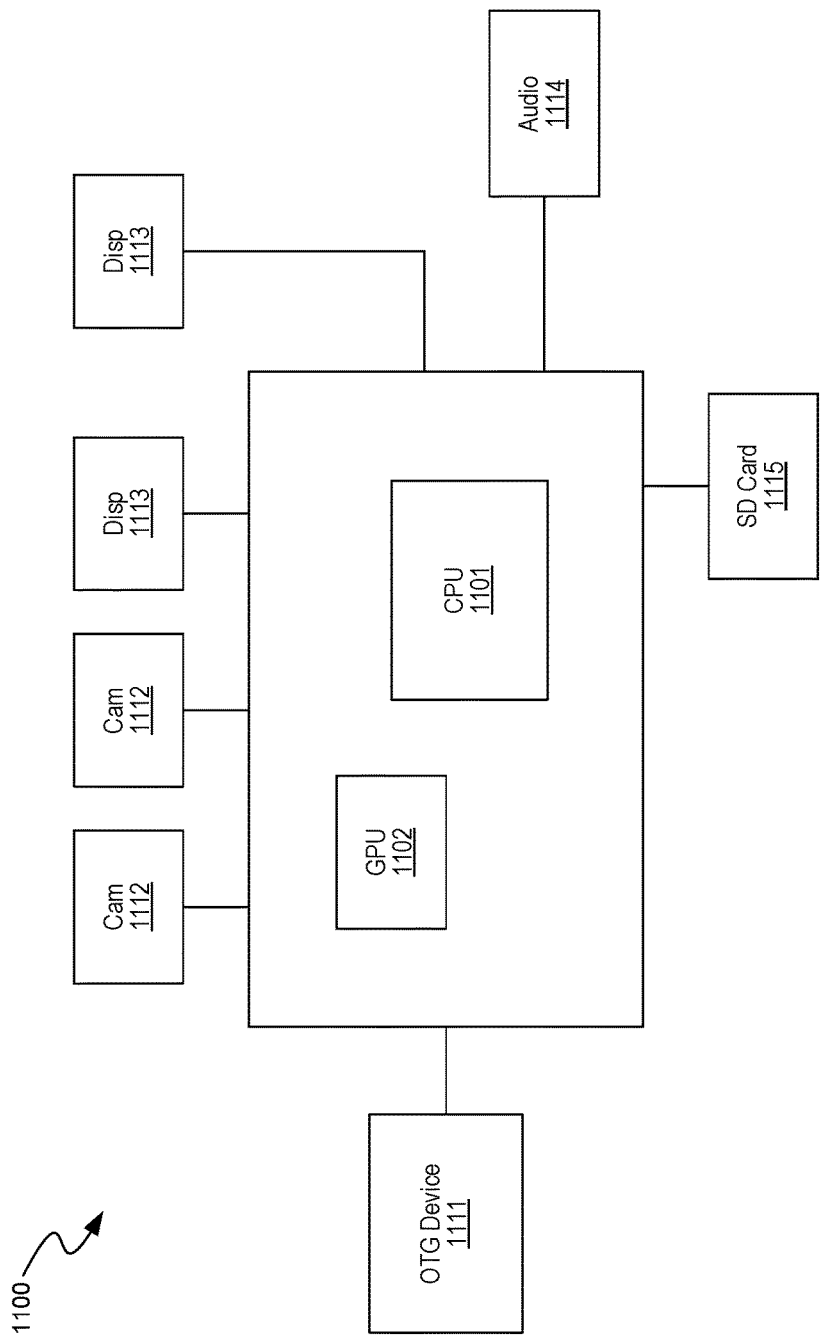
FIG. 11 illustrates an example of hardware architecture of a capture device in a pattern recognition system in accordance with an example embodiment of the disclosed technology.

To process the large amount of data involved in the above-mentioned applications, heterogeneous computing, which refers to systems that use more than one kind of processor or cores, can be utilized to provide real-time performance. FIG. 11 illustrates an example of hardware architecture of a capture device 1100 in a pattern recognition system in accordance with an example embodiment of the disclosed technology. The capture device 1100 includes various templates that allow communication with peripheral devices, such as one or more On-The-Go (OTG) devices 1111, one or more cameras 1112, one or more displays 1113, an audio device 1114, and an external storage 1115 such as an SD card. The capture device 1100 adopts heterogenous computing by using a CPU 1101 and one or more Graphics Processing Units (GPUs) 1102.

In heterogenous computing, algorithms and data are distributed across different types of processing units. For example, algorithms that operate on the data in parallel (also known as data parallelism) are suitable to be executed on the GPUs, while algorithms that focus on function and control (also known as task parallelism) are suitable to be executed on the CPU(s).

Figure 12:
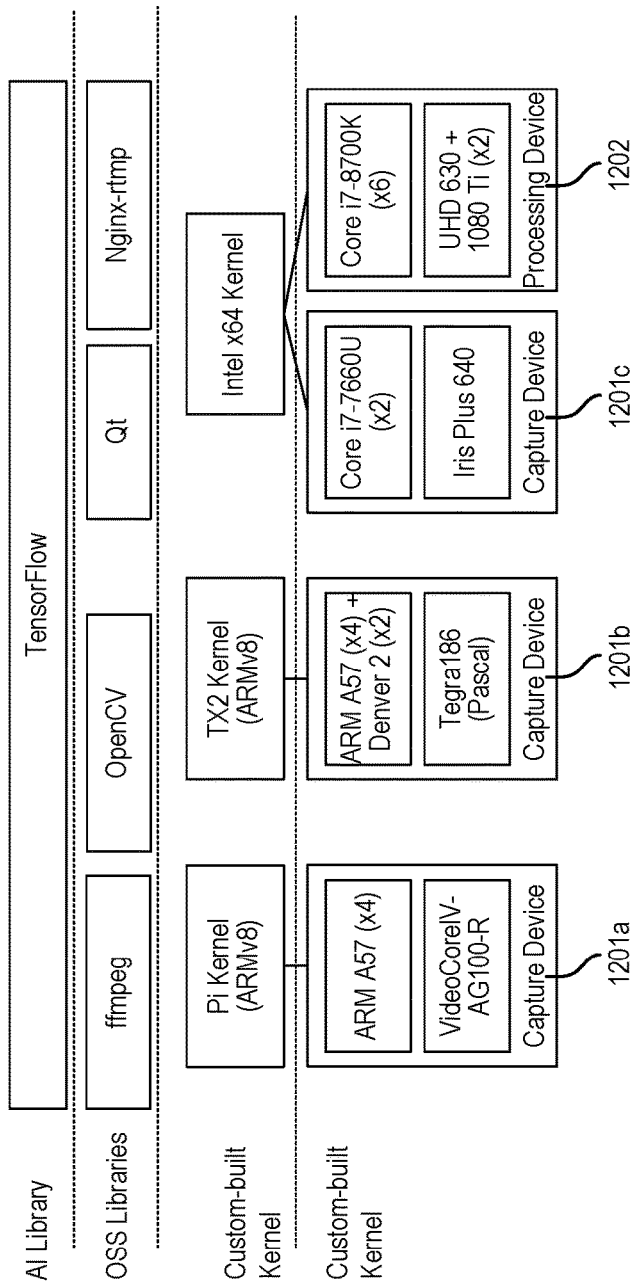
FIG. 12 illustrates an example of software and hardware frameworks that can be used by a pattern recognition system in accordance with an example embodiment of the disclosed technology.

Heterogenous computing presents certain challenges, such as inefficient data transfers, unnecessary data conversions, and an optimal workload distribution. For example, data processing in heterogeneous computing systems can be highly fragmented. This is caused by several factors. First, data management between multiple devices that use different hardware and/or software architectures can be challenging. For example, the capture and processing devices can use various processing units, such as Intel-based CPUs, Advanced RISC Machine (ARM) based CPUs, Intel-based GPUs, NVIDIA-based GPUs, and the combination thereof. FIG. 12 shows a set of example software and hardware frameworks that can be used by a pattern recognition system in accordance with an example embodiment of the disclosed technology. In this example, capture device 1201a includes an ARM A57 with four cores as the CPU. The capture device 1201a also includes a VideoCore IV-AG100-R as the GPU. The capture device 1201a uses a custom-built operating system kernel—Raspberry Pi Kernel—based on ARMv8. Capture device 1201b includes two CPUs: ARM A57 with four cores and Denver 2 with two cores. The capture device 1201b also includes an NVIDIA Tegra186 as the GPU and uses a custom-built kernel Jetson TX2 kernel. Capture device 1201c includes an Intel-based CPU Core i7-7660U with two cores, and an Intel Iris Plus 640 as the GPU. Processing device 1202 includes an Intel-based GPU Core i7-8700K with six cores, and two different GPUs: Intel UHD 630 and Nvidia GeForce 1080 Ti. Both capture devices 1201c and 1202 use Intel x64 kernel for the operating systems. The capture devices 1201a-c and processing device 1202 all use a variety of Open Source Software (OSS) libraries and AI libraries, such as ffmpeg, OpenCV, Qt, Ngix-rtmp, and TensorFlow.

As shown in FIG. 12, capture devices 1201a and 1201b use a reduced instruction set computing (RISC) architecture, while capture device 1201c uses a family of instruction set architecture that is compatible the Intel x86 chipset. The processing device 1202, which can be located locally or remotely, also uses Intel-based instruction sets. Different architectures may use different ways to organize and address data in memory. As a result, to access image data by multiple processors having differing address/data architectures (e.g., ARM A57 and Tegra186, or Core i7 and Iris Plus), the image data must be copied multiple times between the processors so that the data can be properly addressed and accessed.

Additionally, many software components expect specific data formats that may not be compatible with those required by other software components. For example, as shown in FIG. 12, the capture devices 1201a, 1201b, 1201c and the processing device 1102 use libraries such as ffmpeg, OpenCV, and/or Qt. The processing device 1202 uses TensorFlow in a neural network engine to perform pattern or gesture recognition. To allow data captured by the OpenCV library to be successfully processed by TensorFlow, a format conversion (e.g., to uint8, or to float) is needed. Data conversions add additional cost and reduce the processing speed. It is thus desirable to have a data management layer to eliminate unnecessary data format conversions and/or schedule data format conversions at appropriate times to hide latencies.

Some of the disclosed embodiments, among other features and benefits, describe data management systems that allow efficient management and transporting of data for pattern and/or gesture recognition applications. For example, a data management system leverages a customized template for accessing the data in a consistent and efficient manner while minimizing unnecessary data conversions and/or copies across different devices and/or processing units. Some of the disclosed embodiments further relate to techniques that help determine the suitable amount of processing loads for the CPU core(s), the GPU cores and/or other processing engines that may be implemented in a data processing system. The discloses techniques can be used to, for example, reduce latency (e.g., caused by data transfer or data preparation) such that the utilization rate of each processing core is improved.

The following provides additional details to facilitate the understanding of the underlying technology using specific examples. Section headings below are used only to improve readability and do not limit scope of the disclosed embodiments and techniques in each section to only that section.

Example Data Management System for Data Transfer and Conversion

A data management system, including a software program or a software library residing on a non-transitory storage medium that can be accessed and executed by a processor, can be implemented on the capture devices, and/or on processing devices that are located either locally or remotely to the capture devices, to manage data transfers across multiple processing units and/or data conversions between different libraries.

Figure 13:
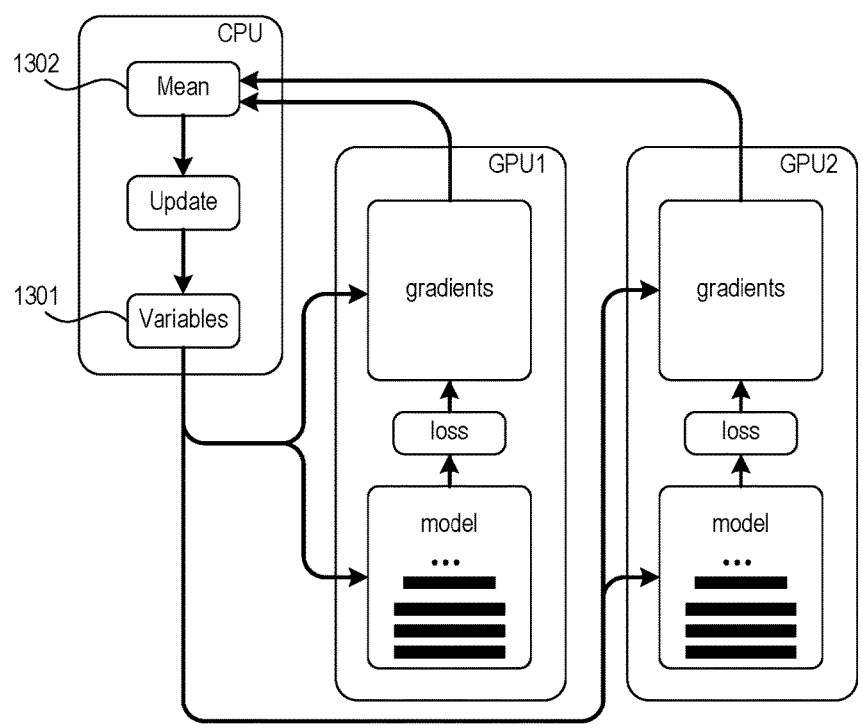
FIG. 13 illustrates an example of a standard TensorFlow process that shows data transfer inefficiency in heterogenous computing.

FIG. 13 illustrates an example of a standard TensorFlow process that shows data transfer inefficiency in heterogenous computing. In FIG. 13, the CPU performs an "Update" operation that updates the variables 1301 based on the mean values 1302. The variables 1301 are used by the model for computations performed on the GPU. The model also computes a corresponding loss, whose value reduces as the model's accuracy improves. In some embodiments, the GPU also constructs symbolic derivatives, known as gradients, based on the variables 1301, which are used by the CPU for the computation of mean values 1302. As shown in FIG. 13, the standard approach requires multiple copies of common values between CPU and the one or more GPUs. For example, the algorithms executed by GPU1 and GPU2 share the variables 1301, which are copied twice from the CPU to the GPU1 and from the CPU to the GPU2. The gradients produced by GPU1 and GPU2 are also copied twice to the CPU for the computation of the mean values 1302.

Figure 14A:
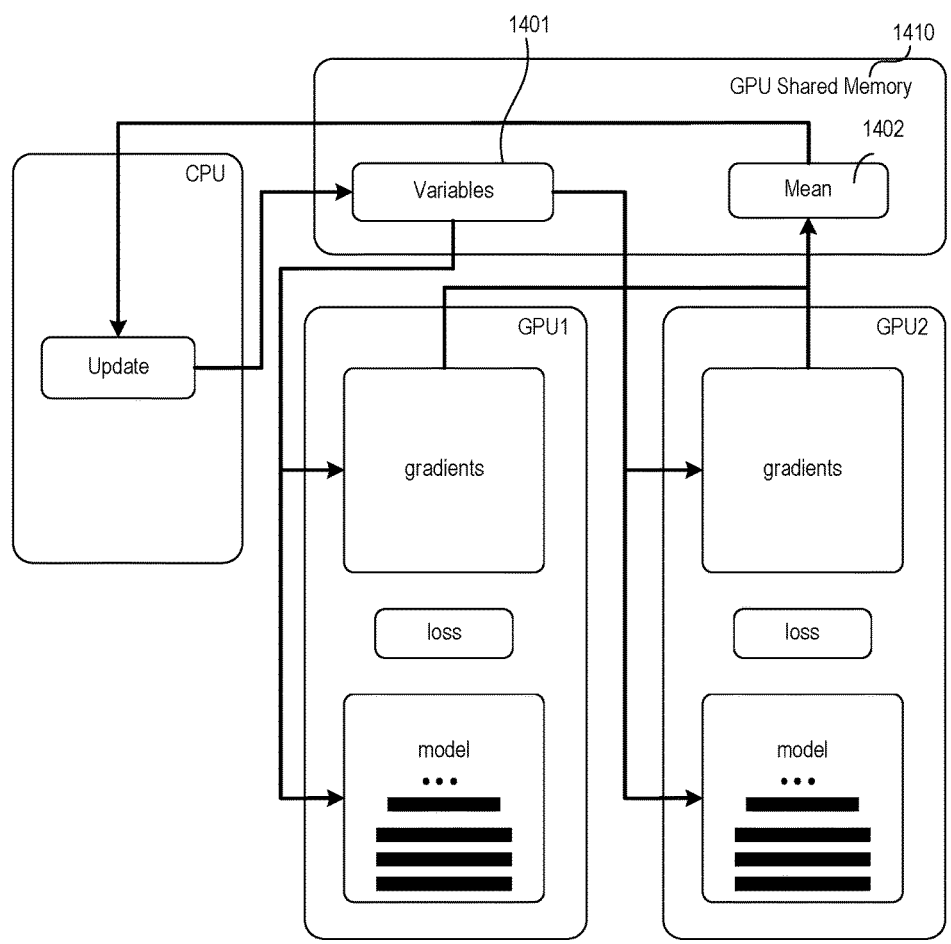
FIG. 14A illustrates an example single-copy approach in accordance with an example embodiment of the disclosed technology.

In such cases, data that is common to the algorithms executed on the GPUs can be managed by a shared memory, thereby reducing the amount of data transfers between CPU and GPUs. FIG. 14A illustrates an example single-copy approach in accordance with an example embodiment of the disclosed technology. In this example, the variables 1401 are copied from the CPU to the GPU shared memory 1410 only once. Then, both GPU1 and GPU2 can access the variables 1401 without incurring additional data transfer time that would be required in the architecture of FIG. 13. Similarly, the mean values produced by GPU1 and GPU2 are also stored in the shared memory 1410. After all the mean values are generated, they are copied once from the shared memory 1410 to the CPU for subsequent updates.

Figure 14B:
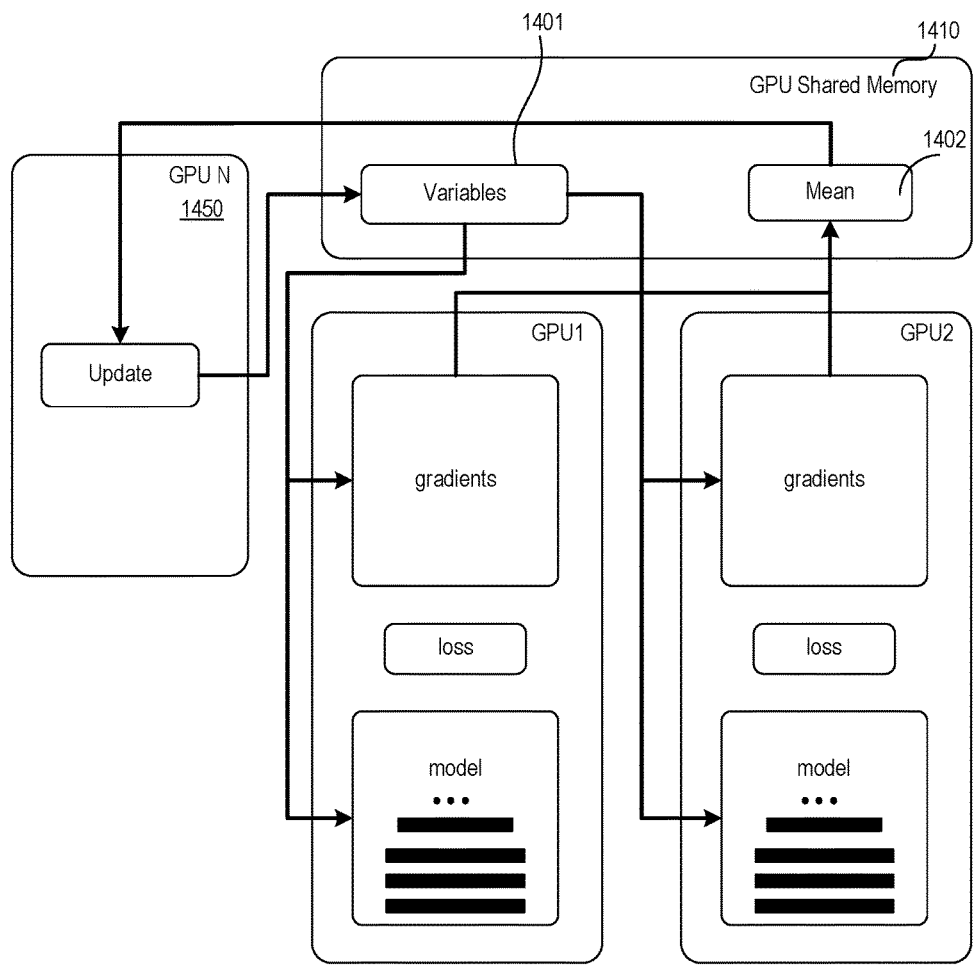
FIG. 14B illustrates an example of a zero-copy approach in accordance with an example embodiment of the disclosed technology.

In some embodiments, a pattern and/or gesture recognition system includes additional GPUs. The control-heavy algorithm previously executed on the CPU can be adapted to run on an additional GPU to leverage the computing resources, thereby eliminating the need of performing data copies altogether. FIG. 14B illustrates an example of a zero-copy approach in accordance with an example embodiment of the disclosed technology. In this example, the CPU is eliminated, and the algorithm that would have been executed on the CPU as shown in FIG. 14A is now run on GPU N (1450). Because all GPUs can access the shared memory 1410, variables 1401 can be set up in the shared memory 1410 directly without performing any copies. Similarly, the mean values 1402 are written directly to the shared memory 1410 to allow them to be accessed GPU N (1450). The GPU N (1450) can perform subsequent updates based on the mean values 1402 without requiring any data transfers between the GPUs. For example, in systems that support Uniform Memory Access (UMA), CPU and GPU can have uniform access to the same data without incurring any cost of copying. Such features can be leveraged by the data management system to reduce data transfer cycles, which becomes especially important in pattern recognition applications due to the large number of data access and processing cycles required for processing image data.

Figure 15:
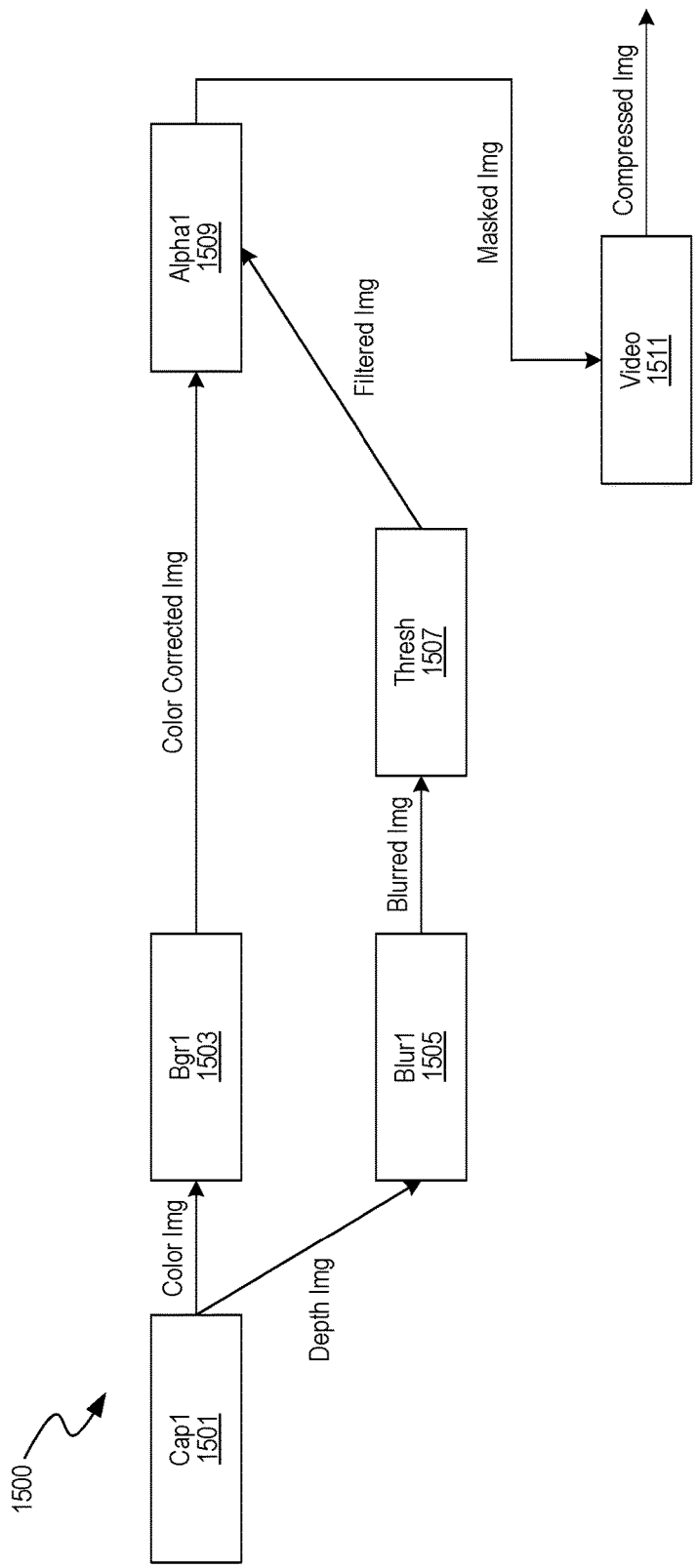
FIG. 15 illustrates an example graph of processing operations used in a pattern and/or gesture recognition system in accordance with an example embodiment of the disclosed technology.
Figure 16A:
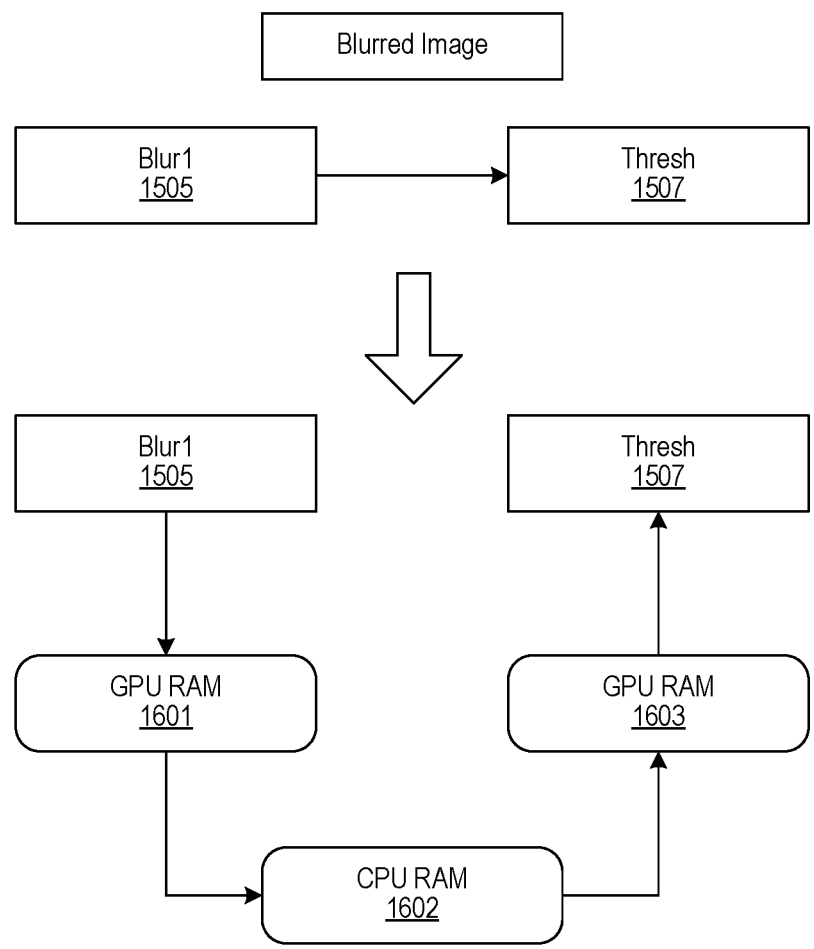
FIG. 16A illustrates an example of generating multiple copies of an image in the blurring stage as shown in FIG. 15.

In some embodiments, to allow the neural network engine to effectively recognize patterns and/or gestures, it is desirable to perform some preliminary processing on the input images captured by the capture device(s). FIG. 15 illustrates an example graph 1500 of processing operations used in a pattern and/or gesture recognition system in accordance with an example embodiment of the disclosed technology. The graph 1500 includes a capture stage 1501 that captures both a color image and a depth image. The color image then goes through a background stage 1503 to produce a color corrected image that differentiates the foreground and the background portions. At the same time, the depth image goes through a blur stage 1505 to generate a blurred depth image. The blurred image then goes through a threshold stage 1507 so that the depth values are kept under a threshold value. The processed color and depth images are combined in an alpha stage 1509 to generate a masked image for masking out the background. The masked image is then fed into the video stage 1511 to produce a compressed video frame. At each stage of the graph 1500, an output image is created for use as an input by the next stage. If an image resides in the CPU memory, copying of the image is then necessary for the GPU(s) to access the image. Similarly, if an image resides in the GPU local memory, copying of the image is necessary for the CPU and other GPU(s) to access the image. Time for each copy operation must be allocated across the entire graph. FIG. 16A illustrates an example of set of operations that are typically carried out at the blur stage 1505 that is shown in FIG. 15 to provide the result to the threshold operation. As shown in the bottom section of FIG. 16A, the input image is copied to GPU Random-Access Memory (RAM) 1601 for the blur operation. The output blurred image is then copied to CPU RAM 1602. The blurred image is copied to GPU RAM 1603 again so that it becomes available to the threshold operation. Without any optimization, the graph shown in FIG. 15 can require a minimum of eight copy operations to complete all the stages.

Figure 16B:
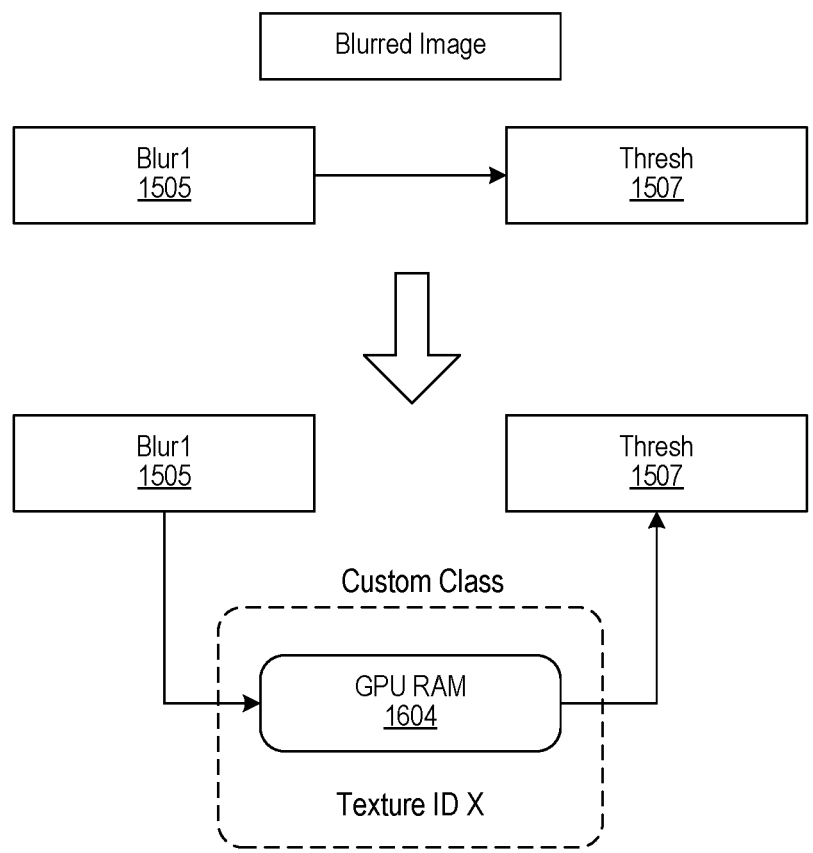
FIG. 16B illustrates an example of a customized template for managing data access in accordance with an example embodiment of the disclosed technology.

To address such performance penalty associated with the multiple copies, a customized code template can be generated to uniformly define attributes for all image data and allow access to the image data without any copies. For example, as shown in FIG. 16B, a custom template that characterizes data access and/or data formats, such as a custom class derived from OpenCv's cv::Mat class, can be defined to manage all captured image data uniformly. In this example, the custom template includes a Texture ID attribute to store the input as textures on the GPU shared memory 1604. The system determines the value of the Texture ID attribute based on where the captured image data is stored (as a texture) in the shared GPU memory 1604. The GPU can then translate the Texture ID value to an actual address value at which the image data is stored. Therefore, the GPUs can access the image without performing any copies. When UMA is enabled, the CPU can also access the image data via the Texture ID (or other similar indicators), thereby eliminating the need to copy the data back and forth between GPU(s) and the CPU.

Figure 16C:
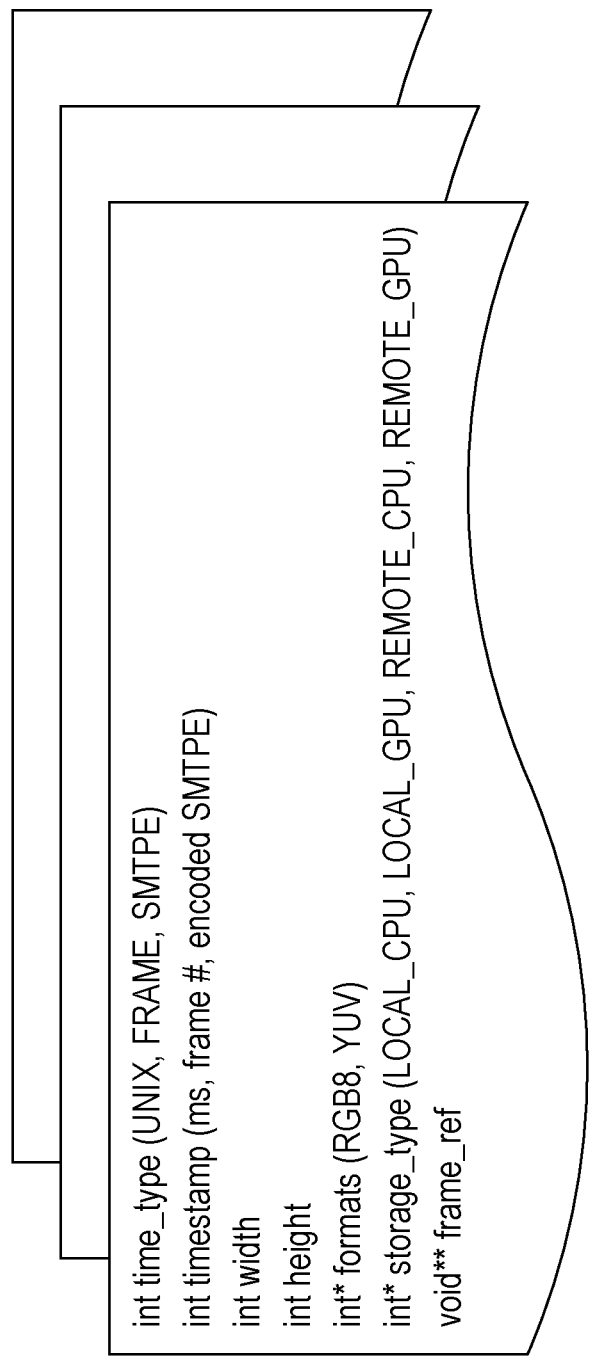
FIG. 16C illustrates an example customized template description for managing data access in accordance with an example embodiment of the disclosed technology.

FIG. 16C illustrates an example description of a customized template for managing data access and format conversions in accordance with an example embodiment of the disclosed technology. In this particular example, the template includes a timestamp attribute to indicate when a data frame is captured. The timestamp allows synchronization of the data across different processing units and different devices. The timestamp value can be in one of the following formats: millisecond, frame number, and/or Society of Motion Picture and Television Engineers (SMPTE) timecode. In some implementations, the template includes a time type value to indicate the type of time units. For example, the time type can be one of Unix system time, a frame number, or a time value used in the SMTPE standards.

The template also includes an attribute that indicates a storage type of the data frame. The value of the storage type indicates where the frame is stored. For example, the data can be stored on a local CPU, a local GPU, a remote CPU, and/or a remote GPU. When multiple processing units are available in a single device, each processing unit is given a corresponding storage type (e.g., local_GPU0, local_GPU1, etc.). The template further includes one or more attributes to indicate the address value(s) of the stored data. Such attribute can be assigned a reference value (e.g., an address value) that corresponds to a particular storage type. In some embodiments, the template can also include attributes such as the width of the frame, the height of the frame, and the format(s) in which the frame is stored.

It is noted that the customized template shown in FIG. 16B and FIG. 16C are only examples of the customized template. The data management system can use other suitable formats to represent and manage the underlying data.

In some embodiments, the data management system can include a data pool to store the customized template of the underlying frames and/or the actual data. For example, the data pool can be organized using a data structure such as a queue, a circular buffer, a stack, and/or a linear buffer. Data stored in the pool (e.g., the corresponding customized template of the data frames) can be ordered based on the timestamps. As discussed above, the timestamps allow synchronization of data frames across different processing units and/or devices.

Figure 17:
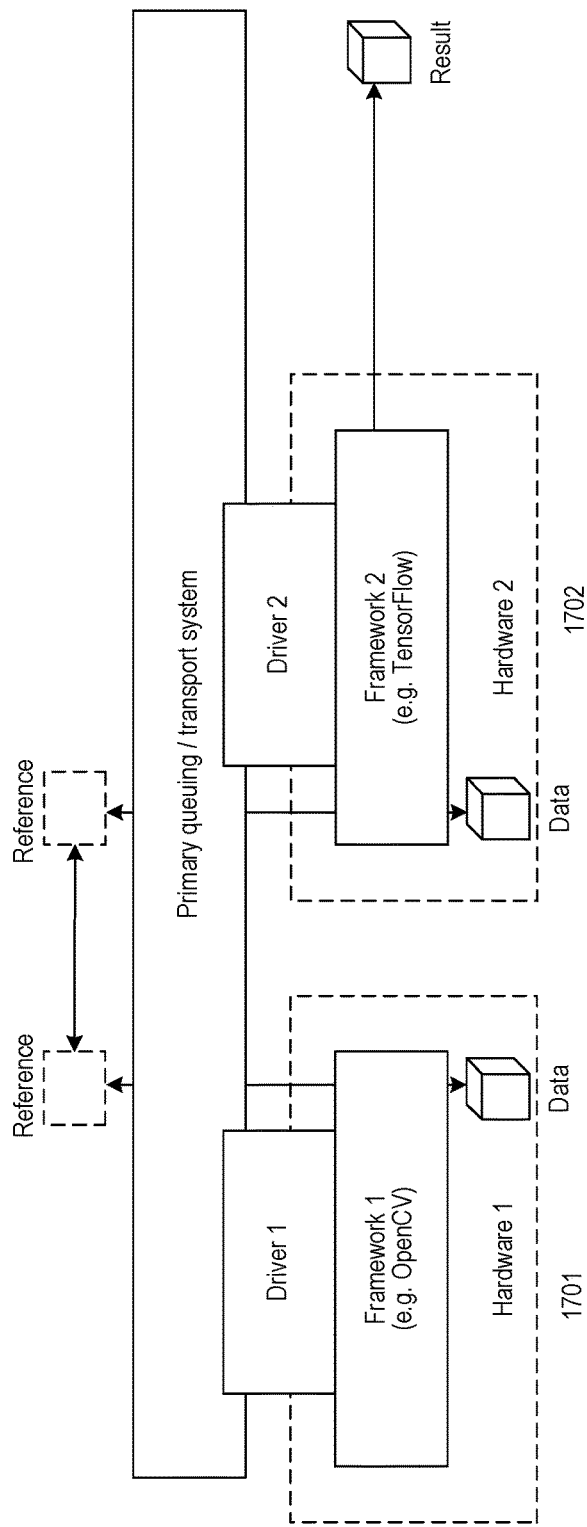
FIG. 17 is a schematic illustration of example functions performed by a data and management system in accordance with an example embodiment of the disclosed technology.

FIG. 17 is a schematic of example functions performed by a data management system in accordance with an example embodiment of the disclosed technology. In FIG. 17, Hardware A 1701 captures input data using Framework 1 (e.g., the OpenCV library). The data management system places the input data in a first location and initiates a preconfigured algorithmic process on the data. For example, the input data can be encoded locally (e.g., on a local GPU) to generate an encoded video (e.g., an H.264/MPEG-4 video) using the operations shown in FIG. 15. As a part of the processing, each frame of the input data is associated with a customized template that includes at least a timestamp to indicate when the frame is captured, a storage type to indicate where the data is placed, and a reference value to indicate the address of the data.

The data management system takes the processed data (e.g., the encoded video) and moves the data to a second location for subsequent processing. In some embodiments, the second location is the same as the first location. For example, if Hardware B 1702 is physically co-located with Hardware A 1701, then each encoded video frame can remain in the GPU for subsequent processing by GPU-enabled TensorFlow. This way, no additional data transfer is needed. In some embodiments, the second location is different than the first location. For example, Hardware B 1702 can be in a remote cloud server. The data management system transports the encoded video to the cloud server to allow Hardware B 1702 to perform proper processing on the data. The relevant fields in the customized template can be updated to replace the local GPU storage type with a remote GPU storage type. In this example, the reference value that corresponds to the storage type can also be updated to indicate the address of the data on the remote Hardware B 1702.

In some embodiments, the customized template allows multiple copies of the data to be maintained at the same time. For example, while Hardware B 1702 processes (and possibly modifies) the video frames to perform pattern and/or gesture recognition, other devices (e.g., a back-up device coupled to Hardware A 1701) may access the original input data at the same time. The data management system can remove the local copy on Hardware A 1701 after the back-up operation is completed, and update the metadata field accordingly. In some embodiments, the data management system can initiate data transfer ahead of time so that transfer latency can be hidden.

In some embodiments, the data management system may support appropriate conversions between various AI engines and computer vision libraries used for performing the pattern and/or gesture recognition. For example, the data management system can convert the captured data in a YUV color space into data in an RGB color space. As another example, the data management system can convert data captured using the OpenCV library to a NumPy array to allow proper access by TensorFlow.

In some implementations, multiple copies of the captured data can be stored. In the example discussed above, after a conversion from the YUV to RGB color space is performed, both copies of data (data in both the YUV and RGB color spaces) are stored to eliminate the need to perform the same conversion again in the future. For example, one copy of the data (e.g., the YUV copy) can be stored in the data pool (e.g., identified as remote CPU storage type in the listing of FIG. 16C), while the other copy (e.g., the RGB copy) can be stored and processed by the processing device. As another example, the data management system can store the intermediate NumPy array in the data pool to avoid additional conversions if the data is to be accessed by TensorFlow again in the future.

As another example, standard TensorFlow image is in the Batch-size-Channel-Height-Width (NCHW) format, while the Nvidia tensor core hardware expects the Batch-size-Height-Width-Channel (NHWC) format. If an input is presented to Compute Unified Device Architecture (CUDA) Deep Neural Network library (cuDNN) in the NCHW format, a conversion operation from NCHW to NHWC (and from NHWC to NCHW) occurs internally, which negates performance improvements by the tensor cores. Given knowledge of the format information, the customized template (e.g., the matrix class) can read data in the proper format to eliminate the need for repeated conversions.

Experiments conducted by the inventors have shown that, without the customized template to manage data access across different types of processing units, the input images (in the RGBD format) can only be processed at a speed of 8.7 frames per second (fps). Using the techniques described above, the processing speed can be drastically improved to above 30 fps.

Example Load Balancing Module for Workload Distribution

Figure 18:
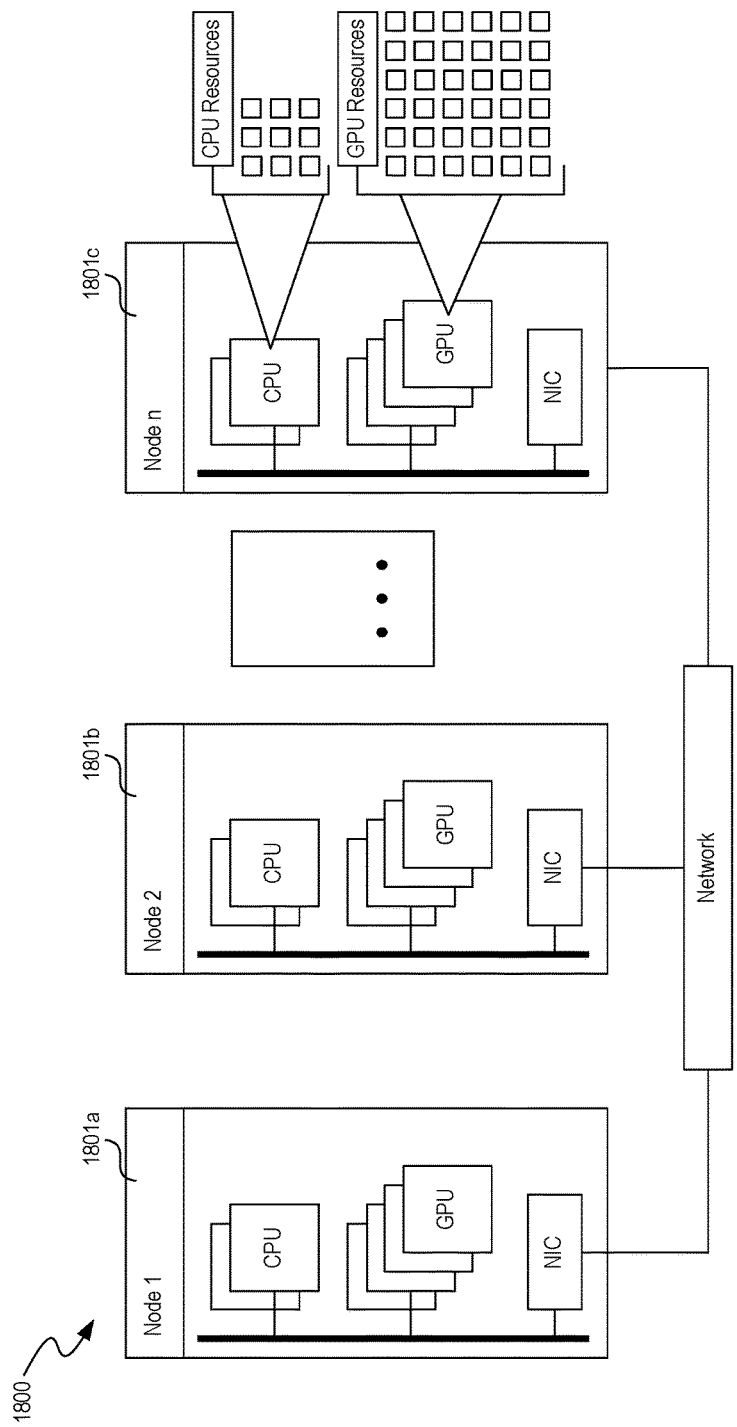
FIG. 18 illustrates an example of hardware architecture of multiple processing nodes in a pattern recognition system in accordance with an example embodiment of the disclosed technology.

FIG. 18 illustrates an example of hardware architecture of multiple processing nodes in a pattern recognition system in accordance with an example embodiment of the disclosed technology. Each processing node 1801a, 1801b, 1801c is a single physical computing system that includes a motherboard, one or more CPU sockets with corresponding CPU resources, one or more GPU cards with corresponding GPU resources, and one or more network interface controllers (NIC) that allows communications with other nodes, and/or with other devices or components, through at least one Network. As discussed above, the amount of control flow in a processing task is an important factor for determining the distribution of workload across multiple processing cores. For example, tasks with complex control flow are suitable to be executed on one or more CPU cores while tasks that include high-level data parallelism are suitable to be executed on GPU cores.

Figure 19A:
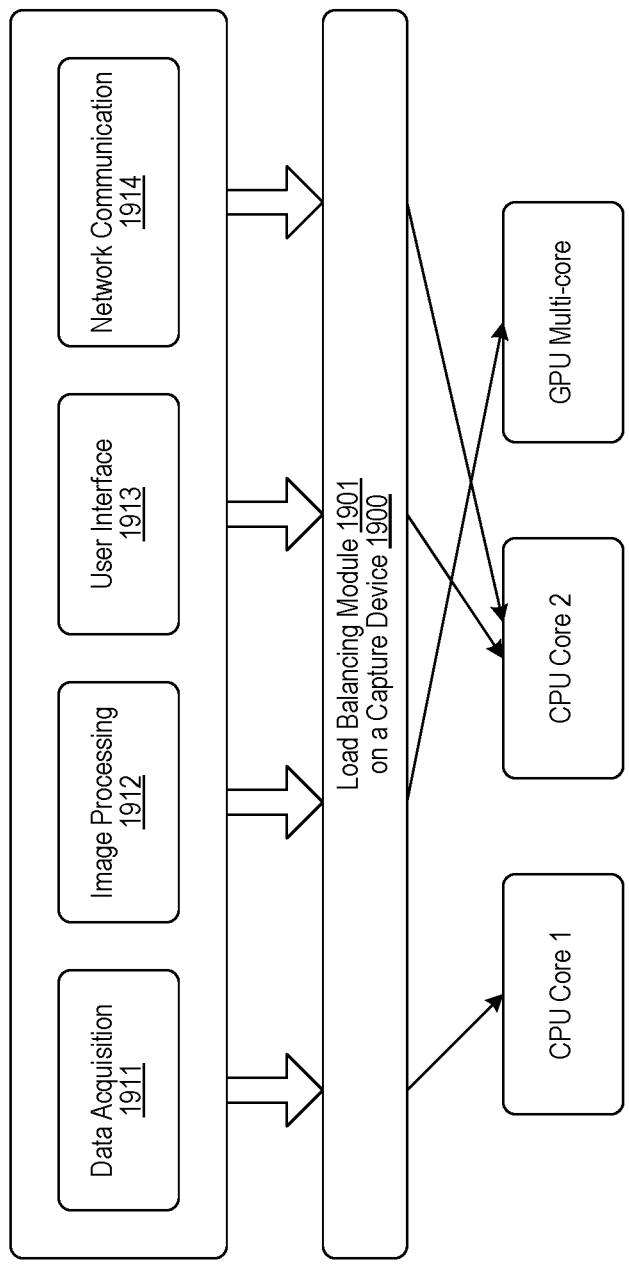
FIG. 19A is a schematic diagram illustrating workload distribution on a capture device in accordance with an example embodiment of the disclosed technology.

FIG. 19A is a schematic diagram illustrating workload distribution on a capture device in accordance with an example embodiment of the disclosed technology. In the example shown in FIG. 19A, a load balancing module 1901, such as a software program or a software library residing on a non-transitory storage medium that can be accessed and executed by a processor, can be implemented on a capture device 1900. The load balancing module can be executed by either a CPU or a GPU of the capture device. The capture device 1900 provides a data acquisition module 1911 (e.g., software programs that communicate with a camera) to capture data. The capture device 1900 can provide an image processing module 1912 to allow the captured data to be processed locally. For example, the captured image frames can be compressed to a video by the image processing module 1912. The capture device 1900 also provides a user interface 1913 to allow users to control and operate the device. The capture device 1900 can further include a network communication module 1914 to transmit captured data to another device for further processing. Thus, the operations on the capture device 1900 can be control-flow heavy, and the load balancing module 1901 may delegate those types of operations to CPU cores. For example, the load balancing module 1901 can determine that data acquisition, the user-template tasks, and network communications are suitable to be executed on CPU cores. The load balancing module thus delegates the data acquisition task to CPU Core 1, and user interface and network communication tasks to CPU core 2. On the other hand, processing of the captured images may involve the same processing operations on a large amount of data. Thus, the load balancing module 1901 determines to delegate such data-intensive tasks to one or more GPU cores.

Figure 19B:
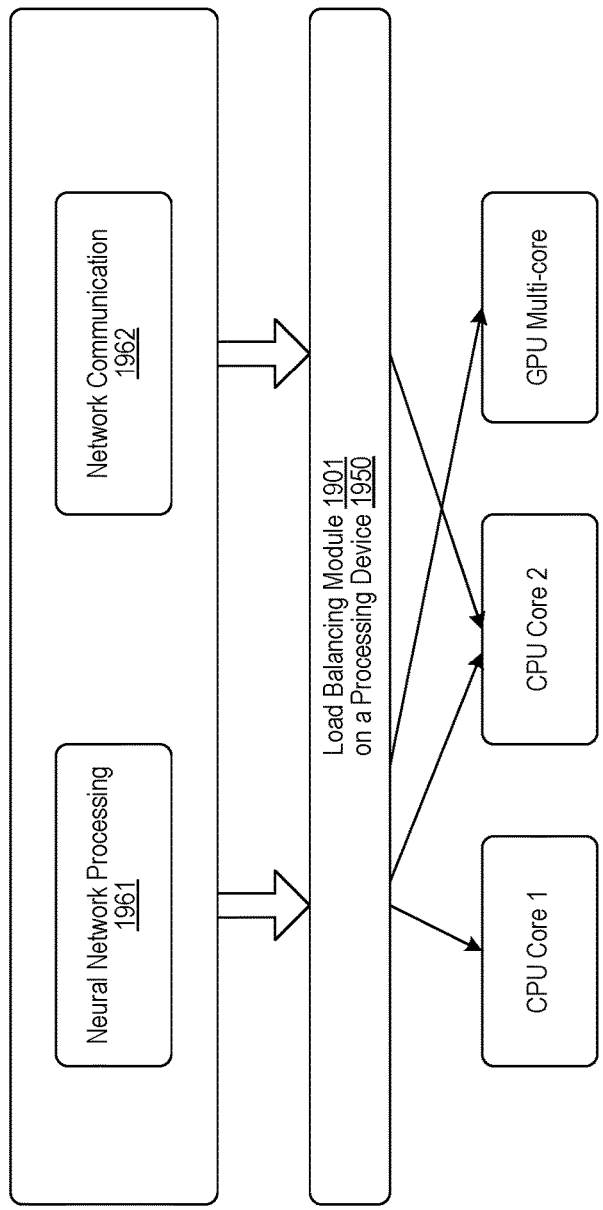
FIG. 19B is another schematic diagram illustrating workload distribution on a processing device in accordance with an example embodiment of the disclosed technology.

To benefit from parallel processing, it is desirable to have large amounts of processor-intensive work to overcome the overhead of parallelization. FIG. 19B is another schematic diagram illustrating workload distribution on a processing device in accordance with an example embodiment of the disclosed technology. The processing device 1950 may be co-located with the capture device. The processing device 1950 may be located remotely from the capture device. In this example, the remote processing device 1950 receives data by a network communication module 1962 from the capture device to perform further processing on the data. The processing device 1950 also includes a neural network processing module 1961 that invokes one or more neural networks to recognize the gestures based on the captured data. The load balancing module 1901 (e.g., load balancing software programs or libraries) can be installed on the processing device to delegate work appropriately. Similarly, the load balancing module can be executed by either a CPU or a GPU of the processing device. For example, the load balancing module 1901 decides to delegate all network communication tasks to one CPU core (e.g., CPU core 2) based on the amount and the complexity of the work. On the processing side, depending on the algorithms adopted by the remote processing device 1950, the load balancing module 1901 may send a portion of the data to the GPU cores for more data-intensive parallel processing. The rest of the data remains on the CPU cores (e.g., CPU core 1 and core 2) due to the complexity of control flow. The load balancing module 1901 can further use a threading model for the CPU tasks so that the amount of idle time on the CPU cores remains as low as possible.

Figure 20A:
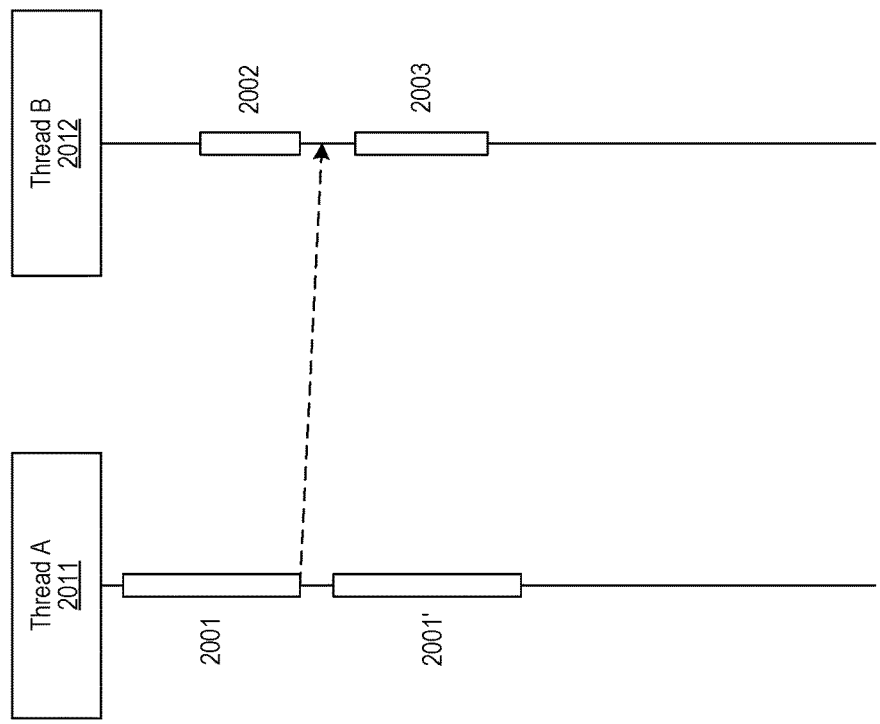
FIG. 20A illustrates an example threading model that can be used for Central Processing Unit (CPU) processing in accordance with an example embodiment of the disclosed technology.

FIG. 20A illustrates an example threading model that can be used for CPU processing in accordance with an example embodiment of the disclosed technology. For simplicity, only one pair of threads (also referred to as ping-pong threads) is used in the context of an image capture, processing and recognition example. The load balancing module first starts Thread A 2011 and Thread B 2012 at the same time. The load balancing module delegates Thread A 2011 to handle the task of input data capturing 2001. In some embodiments, as a part of the input data capturing task 1601, Thread A 2011 can perform some pre-processing operations on the captured data (e.g., color space conversion, or encoding) using the GPU cores. Thread A 2011 then produces an image frame for subsequent processing. For example, Thread A 2011 can preprocess the captured image to remove background pixels, so that only the areas of interest (e.g., foreground pixels that show the gestures) remain in the processed image for subsequent processing. At the same time, Thread B 2012 prepares resources 2002 for a pattern/gesture recognition operation once the input image is ready. For example, Thread B 2012 can allocate a number of cores on CPU/GPU and the necessary amount of memory for the pattern/gesture recognition operation. After Thread B 2012 detects that Thread A 2011 has finished generating the image frame, Thread B 2012 grabs the frame from Thread A 2012 and invokes the pattern/gesture recognition operation 2003. The pattern/gesture recognition operation can be performed entirely on the CPU by Thread B. In some embodiments, the pattern/gesture recognition operation can be executed on a GPU. In some implementations, the operation is divided into several portions for processing on the CPU and/or GPU(s). Thread A 2011 moves onto capturing and processing 2001' of the next frame in parallel with the pattern/gesture recognition operation 2003. This way, latency in preparation and data transfer can be hidden. The threading model can be implemented using various tools including but not limited to the multiprocessing package in Python (version 2.6 or above), Message Passing Interface (MPI), Open Multi-Processing (OpenMP), boost threads, etc.

Figure 20B:
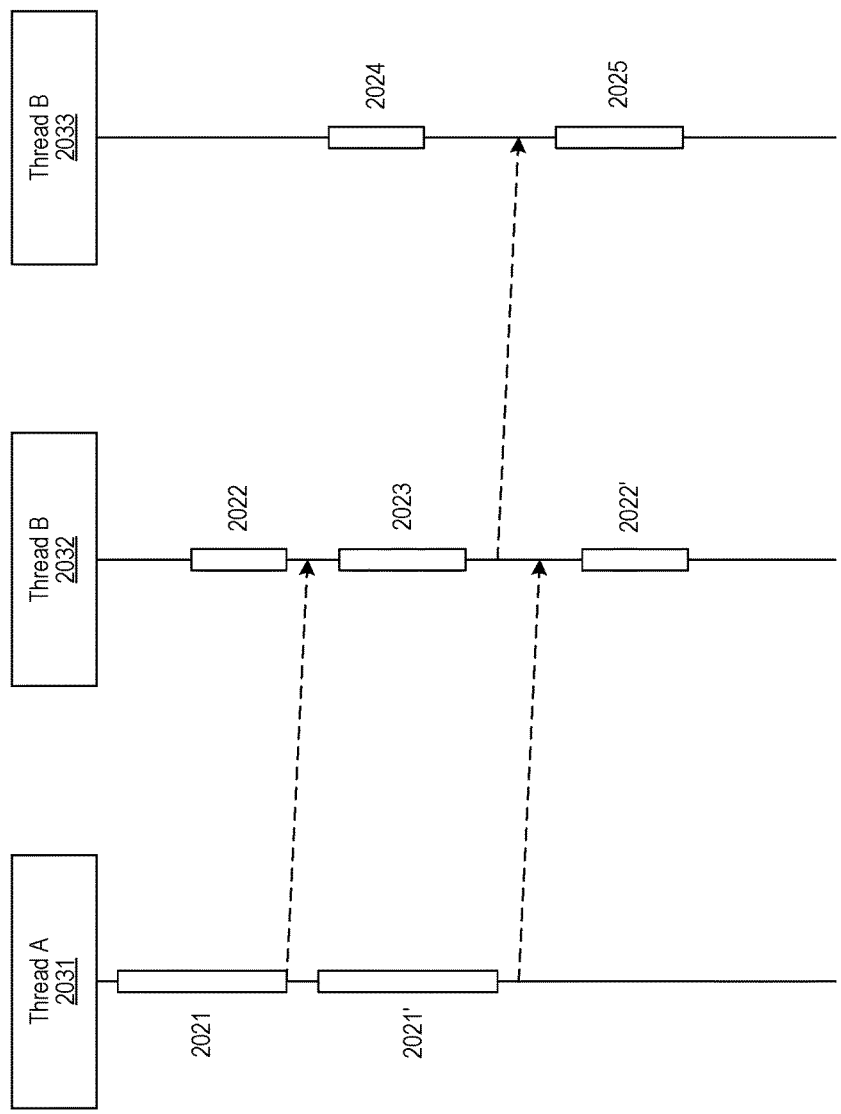
FIG. 20B illustrates another example threading model that can be used for CPU processing in accordance with an example embodiment of the disclosed technology.

FIG. 20B illustrates another example threading model that can be used for CPU processing in accordance with an example embodiment of the disclosed technology. In this example, three threads are used to achieve optimal load balance. The three threads can also be referred to as zing-ping-pong threads. The load balancing module starts Thread A 2031, Thread B 2032, and Thread C 2033 at the same time. The load balancing module delegates Thread A 2031 to handle the task of input data capturing 2021. Thread A 2031 produces a single image frame for subsequent processing. At the same time, Thread B 2032 prepare resources 2022 for a pattern/gesture recognition operation once the input image is ready. After Thread A 2031 finishes generating the image frame, Thread B 2032 and Thread C 2033 continue to process the frame using artificial intelligence techniques.

In some embodiments, the artificial intelligence techniques may include the use of one or more convolutional neural networks (CNNs) and one or more recurrent neural networks (RNNs), which may be combined in architectures that allow real-time processing for of the training images. A convolutional neural network (CNN or ConvNet) is a class of deep, feedforward artificial neural networks that typically use a variation of multilayer perceptrons designed to require minimal preprocessing. A perceptron is a computer model or computerized machine devised to represent or simulate the ability of the brain to recognize and discriminate. This means that the network learns the filters (normally through a training process) needed to identify the features of interest; filters that in traditional algorithms were hand-engineered. This independence from prior knowledge and human effort in feature design is a major advantage of CNNs. CNNs have been successfully used for image (or more generally, visual) recognition and classification (e.g., identifying faces, objects and traffic signs) by using the "convolution" operator to extract features from the input image. Convolution preserves the spatial relationship between pixels by learning image features using input (more specifically, training) data.

In contrast to the CNN, a recurrent neural network (RNN) is a type of artificial neural network where connections between nodes form a directed graph along a sequence. This allows it to exhibit dynamic temporal behavior for a time sequence. Unlike feedforward neural networks, RNNs can use their internal state to process sequences of inputs. That is, RNNs have a feedback loop connected to their past decisions, which lets the RNN exhibit memory. For example, sequential information is preserved in the recurrent network's hidden state, which manages to span many time operations as it cascades forward to affect the processing of each new example. It is finding correlations between events separated by many moments, and these correlations are called "long-term dependencies", because an event downstream in time depends upon, and is a function of, one or more events that came before.

For example, referring back to FIG. 20B, Thread B 2032 can process the frame using a primary neural network such as a two-dimensional (2D) CNN 2023. Alternatively, a three-dimensional (3D) CNN can be used to not only process 2D frame information but also depth information included in the image frame(s). The CNN operation can be performed entirely on a CPU core or can be divided into several portions for processing on both the CPU and GPU cores. In the example shown in FIG. 20B, thread C 2033 prepares resources 2024 at the same time and processes the output from CNN using one or more secondary neural networks 2025. For example, Thread C 2033 may invoke a RNN with persistent memory. Thread A 2031 moves onto capturing of the next frame 2021' in parallel with the image recognition operations performed by Thread B 2032 and Thread C 2033. This way, latency in preparation and data transfer can be hidden. Similarly, the threading model can be implemented using various tools including but not limited to the multiprocessing package in Python (version 2.6 or above), MPI, OpenMP, boost threads, etc.

Figure 21:
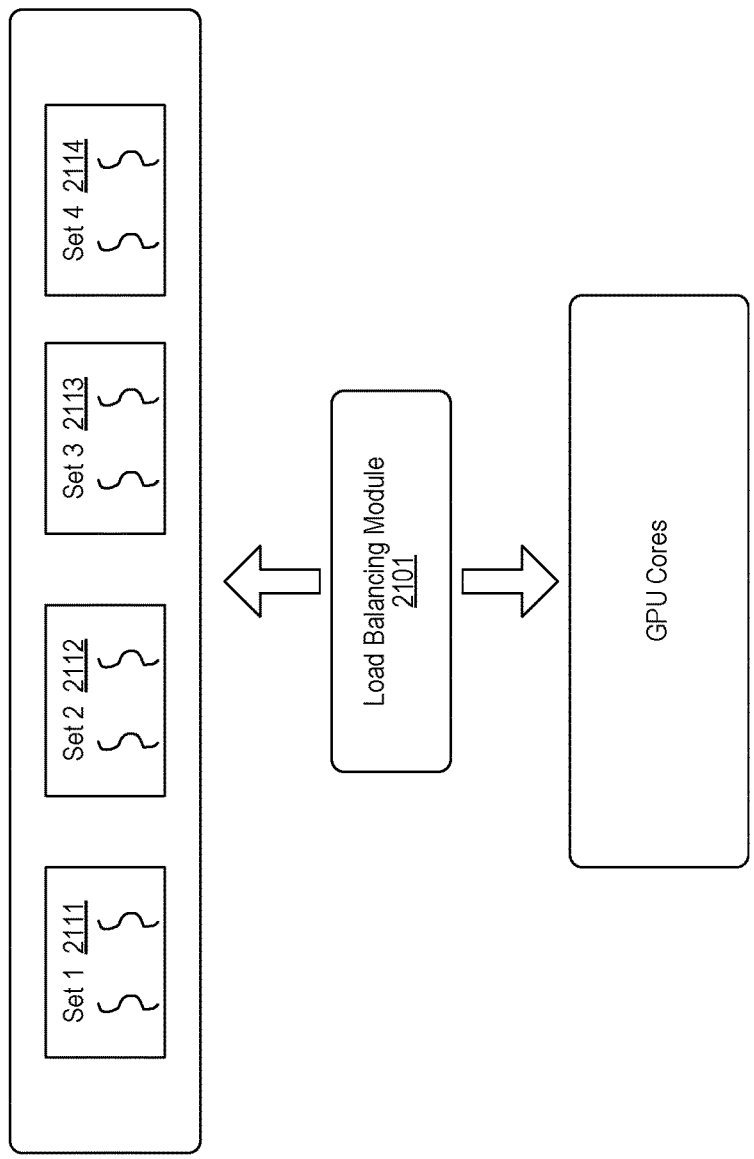
FIG. 21 illustrates yet another example threading model in accordance with an example embodiment of the disclosed technology.

FIG. 21 illustrates yet another threading model in accordance with an example embodiment of the disclosed technology. In this example, the load balancing module 2101 manages multiple sets of ping-pong or zing-ping-pong threads (thread sets 2111-2114). The thread sets 2111-2114 can be represented by multiple bits. For example, one thread set that includes two threads can be represented by two bits: "00." In some implementations, one or more sets can be marked as active thread sets, while the remaining sets provide failover support. The corresponding bits for the thread sets can be marked as "11 11 11 . . . 00," with bit "1" indicating an active thread and bit "0" indicating an inactive, failover thread. In some implementations, all thread sets remain active to allow load balancing of the tasks across all CPU cores. The corresponding bits are marked to "1" to indicate that all threads are active. The load balancing module 2101 may schedule CPU intensive tasks in parallel with data transfers between the GPU and CPU to further hide the data latency.

In some embodiments, as shown in FIGS. 3-5, the capture device may include multiple sensors (e.g., cameras) to capture multiple images at the same time (e.g., multi-aperture capturing). Multiple thread sets, each corresponding to a particular camera, can be configured to obtain input streams from the cameras and process the input streams at the same time. In some embodiments, the capture device may include multiple GPUs so that processing of multiple input streams can be conducted independently on each GPU in parallel. In some embodiments, the capture device includes a CPU and a single GPU—the load balancing module thus schedules the thread sets accordingly to minimize data copy and/or transfer between the CPU cores and the GPU.

For example, as shown in FIG. 21, the load balancing module maintains four sets of ping-pong threads, represented by eight bits. The capture device can include three cameras to capture input data. The load balancing module first starts three sets (2111-2113) of active ping-pong threads (e.g., "11 11 11 00"), each set corresponding to a particular camera to obtain data from the camera and perform subsequent gesture recognition. After the three thread sets finish preliminary gesture recognition of the input data, a fourth set of threads 2114 can be activated (e.g., "11 11 11 11") to take into account additional information in the input (e.g., temporal associations between various frames) and produce a more comprehensive recognition result. Concurrently, the first three sets of ping-pong threads can move onto capturing and processing of more input data, thereby minimizing performance impact on the translation system while providing a more accurate interpretation of the hand gestures.

As the input images change, the amount of work to be performed by the CPU and GPU(s) may change at the same time. In order to increase utilization rate of the CPU and GPU resources, the load balancing module can dynamically determine the suitable amount of work for CPU and GPUs.

FIG. 22 illustrates an example of a load balancing module that dynamically schedules resources on multiple processing nodes in accordance with an example embodiment of the disclosed technology. In this example, the load balancing module (e.g., software programs that communicate with a camera) can be executed by either on a CPU or a GPU of the capture device. The load balancing module 2200 collects system utilization data during execution. For example, the load balancing module 2200 detects the used CPU and GPU resources. The used GPU resources are grouped in units "towers": Tower A 2210 (depicted as the left 9 gray squares in FIG. 22) and Tower B 2211 (e.g., the right 9 gray squares). The load balancing module 2200 then computes the changes to the resource allocation configurations to increase system utilization rate. The load balancing module 2200 applies the changes to resource allocation on different processing units, resulting in modified tower shapes (e.g., 2210' and 2211') and utilization profiles.

In some embodiments, the load balancing module 2200 can be trained using existing data to determine the optimal resource allocation for processing image data. For example, the load balancing module 2200 observes and stores outcome results, and a learning algorithm, such as supervised learning, unsupervised learning, or reinforcement learning, to increase performance of future outcomes. In some embodiments, the learning algorithm can be executed directly on the GPU to determine subsequent resource allocation.

Figure 23:
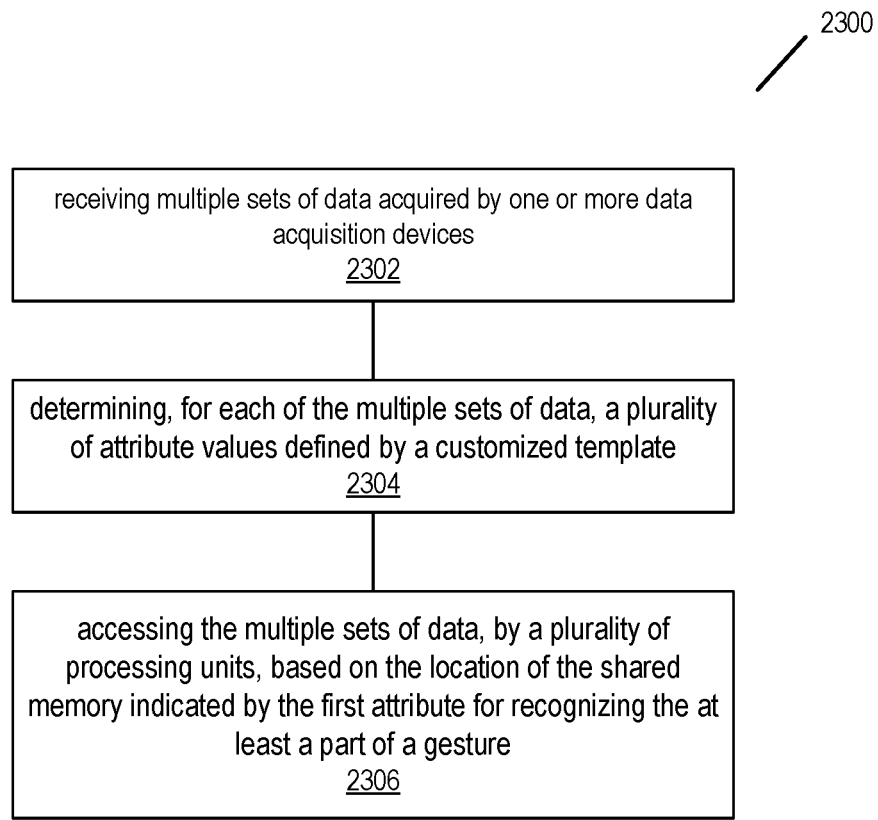
FIG. 23 is a flowchart representation of a method of managing data for a sign language translation system in accordance with an example embodiment of the disclosed technology.

FIG. 23 is a flowchart representation of a method 2300 of managing data for a sign language translation system in accordance with some exemplary embodiments. The method 2300 includes, at 2302, receiving multiple sets of data acquired by one or more data acquisition devices. Each set of data includes an image frame that illustrates at least a part of a gesture, and the gesture represents a letter, a word, or a phrase in a sign language. The method 2300 includes, at 2304, determining, for each of the multiple sets of data, a plurality of attribute values defined by a customized template. The customized template uniformly defines a plurality of attributes for all sets of data captured by the one or more data acquisition devices including a first attribute that indicates a location of the shared memory for storage of the corresponding set of data and a second attribute that indicates when the corresponding gesture is captured. The method 2300 includes, at 2306, accessing the multiple sets of data, by a plurality of processing units, based on the location of the shared memory indicated by the first attribute for recognizing the at least a part of a gesture. The location allows at least one of the plurality of processing units to access the multiple sets of data in the memory without copying the multiple sets of data to any other memory location.

Figure 24:
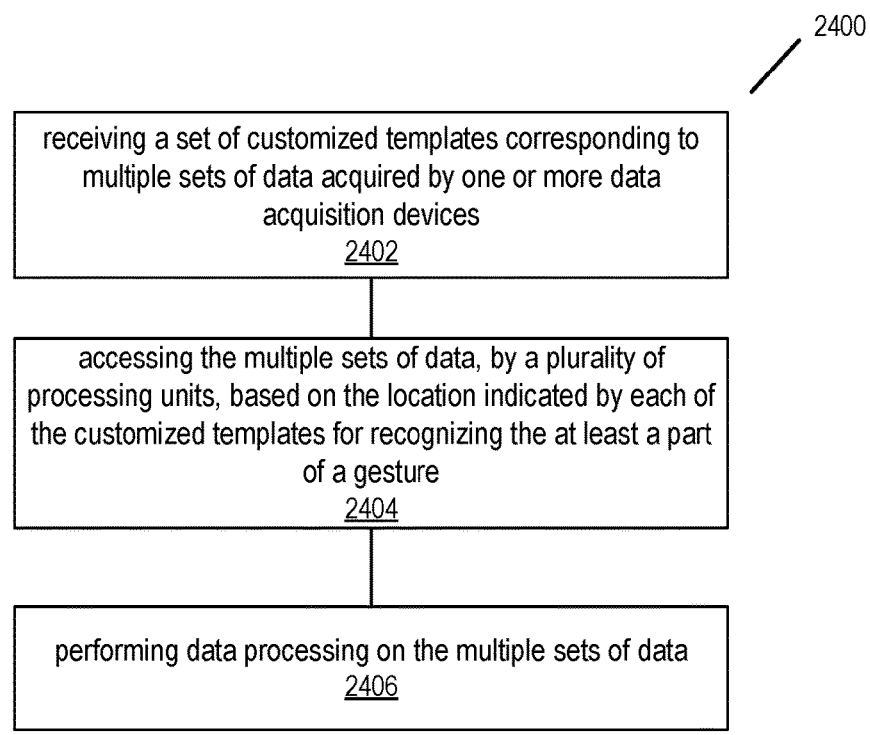
FIG. 24 is a flowchart representation of a method of managing data for a sign language translation system in accordance with an example embodiment of the disclosed technology.

FIG. 24 is a flowchart representation of a method 2400 of managing data for a sign language translation system. The method 2400 includes, at 2402, receiving a set of customized templates corresponding to multiple sets of data acquired by one or more data acquisition devices. Each set of the data including an image frame that illustrates at least a part of a gesture, and the gesture represents a letter, a word, or a phrase in a sign language. Each of the customized templates comprises an indicator that indicates a location at which the corresponding set of data is stored. The method 2400 includes, at 2404, accessing the multiple sets of data, by a plurality of processing units, based on the location indicated by each of the customized templates for recognizing the at least a part of a gesture. The location allows at least one of the plurality of processing units to access the multiple sets of data without copying the data. The method 2400 also includes, at 2406, performing data processing on the multiple sets of data.

Figure 25:
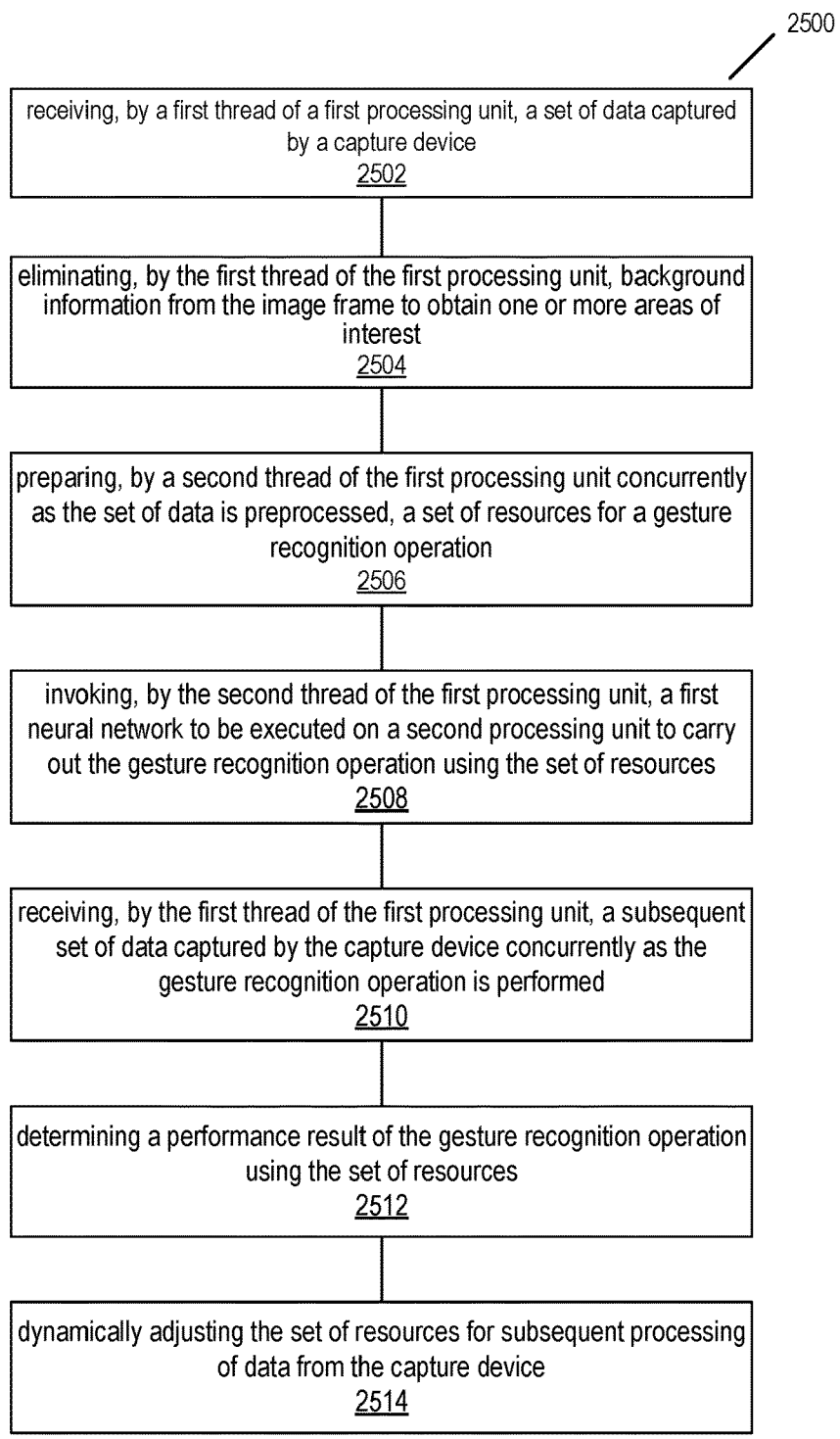
FIG. 25 is a flowchart representation of a method for improving computational efficiency of a computer system for use in a sign language translation system in accordance with an example embodiment of the disclosed technology.

FIG. 25 is a flowchart representation of a method 2500 for improving computational efficiency of a computer system for use in a sign language translation system. The method 2500 includes, at 2502, receiving, by a first thread of a first processing unit, a set of data captured by a capture device. The set of data includes an image frame that illustrates a gesture representing a letter, a word, or a phrase in a sign language. The method 2500 includes, at 2504, eliminating, by the first thread of the first processing unit, background information from the image frame to obtain one or more areas of interest. The method 2500 includes, at 2506, preparing, by a second thread of the first processing unit concurrently as the set of data is preprocessed, a set of resources for a gesture recognition operation. The gesture recognition operation may include performing segmentation on the set of data and/or matching the resulted segments with signs stored in a database. Pattern or gesture recognition typically includes processing the raw data and converting it into a form that can be consumed by a computer, a neural network or an artificial intelligence system. The recognition sometime is carried out using classification and/or cluster of patterns; in classification, an appropriate class label is assigned to a pattern based on, for example, a set of training patterns; clustering typically generates a partition of the data that can be more directly examined to make a decision.

Referring to FIG. 25, the method 2500 includes, at 2508, invoking, by the second thread of the first processing unit, a first neural network to be executed on a second processing unit to carry out the gesture recognition operation on the one or more areas of interest using the set of resources. The method 2500 includes, at 2510, receiving, by the first thread of the first processing unit, a subsequent set of data captured by the capture device concurrently as the gesture recognition operation is being performed. The method 2500 includes, at 2512, determining a performance result of the gesture recognition operation. The method 2500 also includes, at 2514, dynamically adjusting the set of resources for subsequent processing of data from the capture device to improve the performance result.

Figure 26:
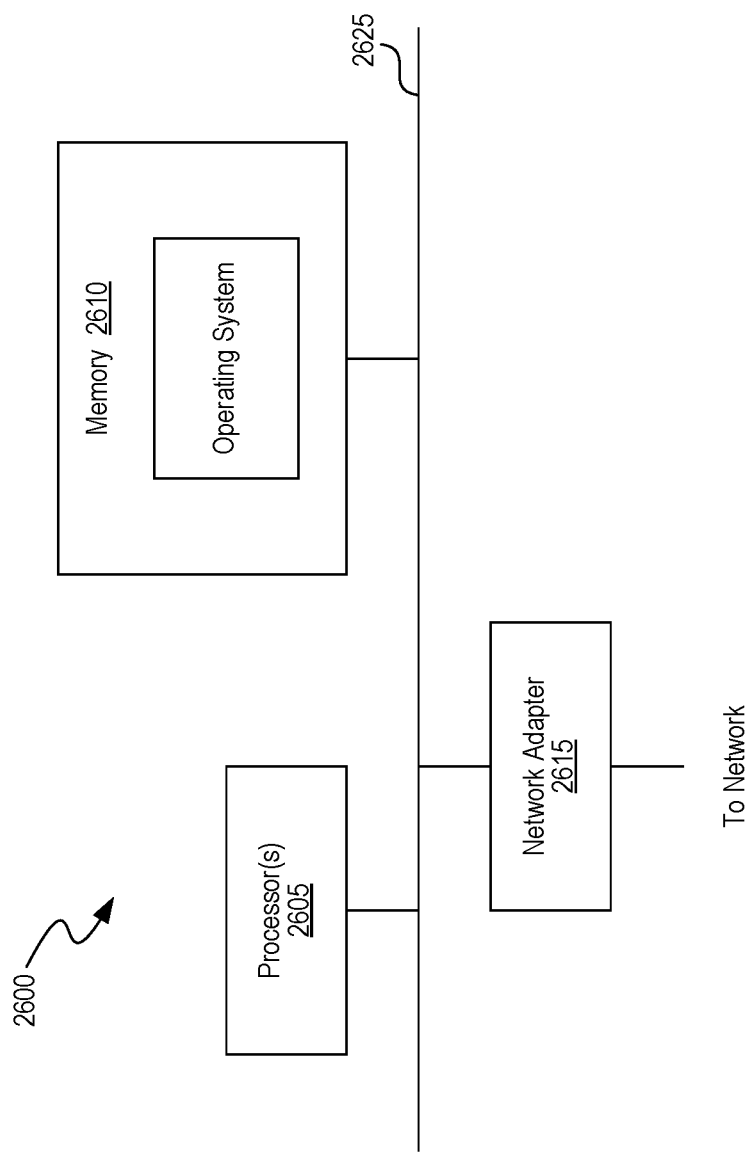
FIG. 26 is a block diagram illustrating an example of the architecture for a computer system or other control device that can be utilized to implement various portions of the presently disclosed technology.

FIG. 26 is a block diagram illustrating an example of the architecture for a computer system or other control device 2600 that can be utilized to implement various portions of the presently disclosed technology. In FIG. 26, the computer system 2600 includes one or more processors 2605 and memory 2610 connected via an interconnect 2625. The interconnect 2625 may represent any one or more separate physical buses, point to point connections, or both, connected by appropriate bridges, adapters, or controllers. The interconnect 2625, therefore, may include, for example, a system bus, a Peripheral Component Interconnect (PCI) bus, a HyperTransport or industry standard architecture (ISA) bus, a small computer system template (SCSI) bus, a universal serial bus (USB), IIC (I2C) bus, or an Institute of Electrical and Electronics Engineers (IEEE) standard 674 bus, sometimes referred to as "Firewire."

The processor(s) 2605 may include central processing units (CPUs) to control the overall operation of, for example, the host computer. In certain embodiments, the processor(s) 2605 accomplish this by executing software or firmware stored in memory 2610. The processor(s) 2605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 2610 can be or include the main memory of the computer system. The memory 2610 represents any suitable form of random access memory (RAM), read-only memory (ROM), flash memory, or the like, or a combination of such devices. In use, the memory 2610 may contain, among other things, a set of machine instructions which, when executed by processor 2605, causes the processor 2605 to perform operations to implement embodiments of the presently disclosed technology.

Also connected to the processor(s) 2605 through the interconnect 2625 is a (optional) network adapter 2615. The network adapter 2615 provides the computer system 2600 with the ability to communicate with remote devices, such as the storage clients, and/or other storage servers, and may be, for example, an Ethernet adapter or Fiber Channel adapter.

Figure 27:
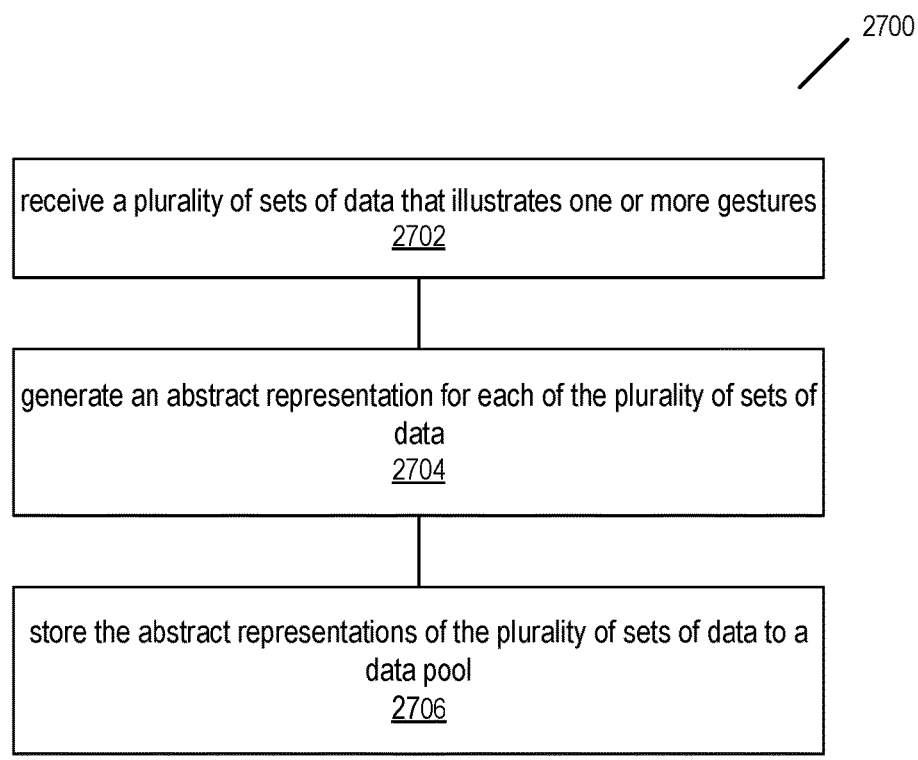
FIG. 27 is a flowchart representation of a method of managing and transporting data for a sign language translation system in accordance with an example embodiment of the disclosed technology.

FIG. 27 is a flowchart representation of a method 2700 of managing and transporting data for a sign language translation system in accordance with the disclosed technology. The method 2700 includes, at 2702, receiving a plurality of sets of data acquired by one or more data acquisition devices or data capture devices. Each set of data includes an image frame that illustrate at least a part of a gesture. The gesture represents a letter, a word, or a phrase in a sign language. The method 2700 includes, at 2704, generating an abstract representation for each of the plurality of sets of data. The abstract representation comprises a timestamp that indicates when a corresponding set of data is captured, a storage type that indicates where the corresponding set of data is stored, and a reference value that indicates an address value for storing the corresponding set of data. The method 2700 includes, at 2706, storing the abstract representations of the plurality of sets of data to a data pool to facilitate subsequent processing of the plurality of sets of data including the image frames.

In some embodiments, the data pool is located at a device different than the one or more data acquisition devices. In some embodiments, the data pool includes a data structure to organize the abstract representations based on the timestamps.

In some embodiments, the method includes capturing the plurality of sets of data by the one or more data acquisition devices, and transmitting the plurality of sets of data to another device configured to process the plurality of sets of data.

In some embodiments, the timestamp is represented by at least one of the following formats: a millisecond, a frame number, a Society of Motion Picture and Television Engineers (SMPTE) timecode. In some embodiments, the reference type includes one of the following: local CPU storage, local GPU storage, remote CPU storage, and remote GPU storage.

In some embodiments, the abstract representation further comprises at least one of: a width of the image frame, a height of the image frame, or a color-space format in which the image frame is stored in.

In some embodiments, the reference value is unique across all devices in the sign language translation system, the reference value indicating a physical address value at one of the devices.

Figure 28:
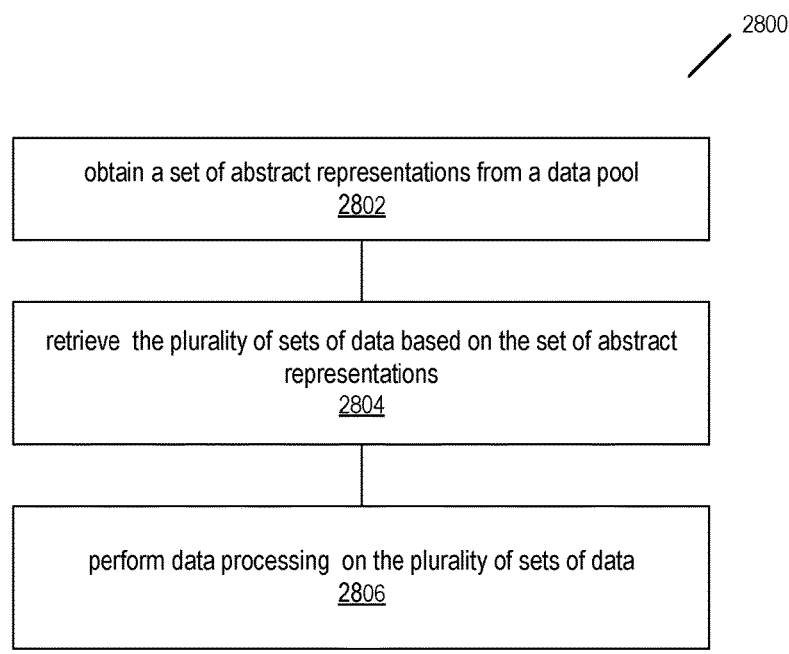
FIG. 28 is a flowchart representation of a method of managing and transporting data for a sign language translation system in accordance with an example embodiment of the disclosed technology.

FIG. 28 is a flowchart representation of a method 2800 of managing and transporting data for a sign language translation system in accordance with the disclosed technology. The method 2800 includes, at 2802, obtaining a set of abstract representations from a data pool. The set of abstract representations correspond to a plurality of sets of data acquired by one or more data acquisition devices including image frames that illustrate at least a part of a gesture. The gesture represents a letter, a word, or a phrase in a sign language. Each of the abstract representations comprises a timestamp that indicates when a corresponding set of data is captured, a reference type that indicates a type of storage for the corresponding set of data, and a reference value that indicates an address value for storing the corresponding set of data. The method 2800 includes, at 2804, retrieving the plurality of sets of data based on the set of abstract representations. The method 2800 also includes, at 2806, performing data processing on the plurality of sets of data.

In some embodiments, the data pool is located at a device different than the one or more data acquisition devices. In some embodiments, the data pool includes a data structure to organize the set of abstract representations based on the timestamps. In some embodiments, retrieving the plurality sets of data comprises transmitting the plurality of sets of data from the one or more data acquisition devices to a processing device.

In some embodiments, wherein the timestamp is represented by at least one of the following formats: a millisecond, a frame number, a Society of Motion Picture and Television Engineers (SMPTE) timecode. In some embodiments, the reference type includes one of the following: local CPU storage, local GPU storage, remote CPU storage, and remote GPU storage. In some embodiments, the abstract representation further comprises at least one of: width of the image frame, a height of the image frame, or a color-space format in which the image frame is stored in.

In some embodiments, the reference value is unique across all devices in the sign language translation system, the reference value indicating a physical address value at one of the devices.

Figure 29:
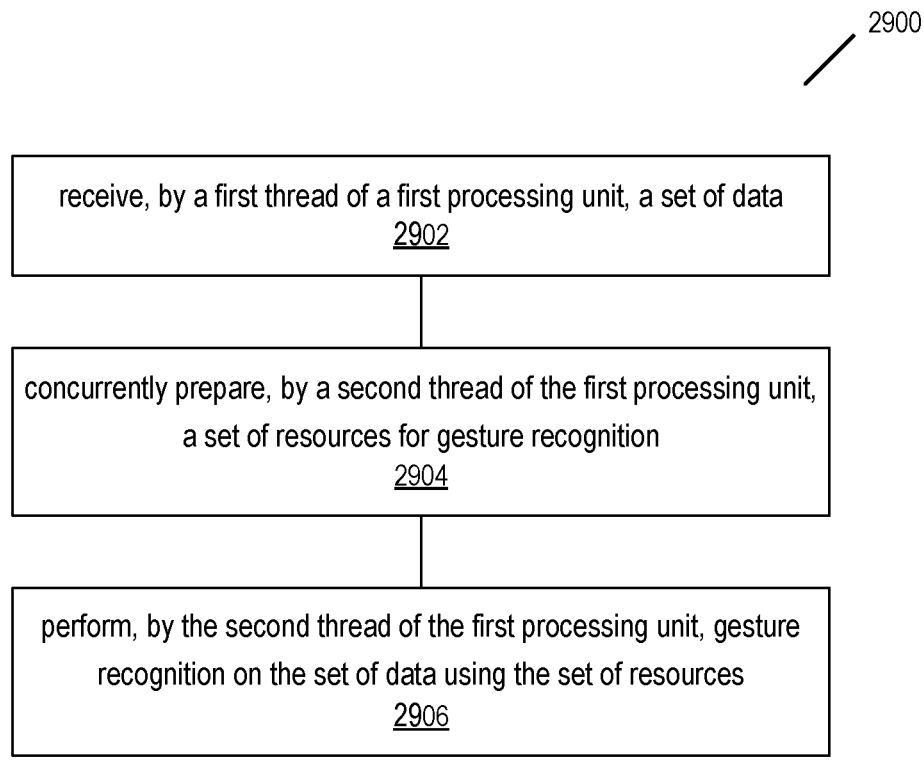
FIG. 29 is a flowchart representation of a method for translating a sign language in accordance with an example embodiment of the disclosed technology.

FIG. 29 is a flowchart representation of a method 2900 for translating a sign language in accordance with an example embodiment of the disclosed technology. The method 2900 includes, at 2902, receiving, by a first thread of a first processing unit, a set of data obtained by a capture device. The set of data includes an image frame that illustrates a gesture representing a letter, a word, or a phrase in a sign language. The method 2900 includes, at 2904, preparing, concurrently as the first thread obtains the set of data, a set of resources for a gesture recognition operation by a second thread of the first processing unit. The method 2900 also includes, at 2906, performing, by the second thread of the first processing unit, the gesture recognition operation based on the set of data using the set of resources.

It is thus evident that the techniques described in this document can be implemented in various embodiments to reduce performance cost in data transfers and conversion in heterogenous systems in order to enhance the performance of pattern and/or gesture recognition systems. The disclosed techniques can also be utilized to optimize workload distributions among different processing units and cores, thereby allowing pattern and/or gesture recognition systems to achieve real-time performance even though processing a large amount of image data is required.

In one example aspect, an apparatus in a sign language processing system includes a plurality of processing units, a non-transitory memory including instructions stored thereupon, and a shared memory accessible to the plurality of processing units. The instructions upon execution by a first processing unit of the plurality processing units cause the first processing unit to receive multiple sets of data acquired by one or more data acquisition devices. Each set of data including an image frame that illustrates at least a part of a gesture, wherein the gesture represents a letter, a word, or a phrase in a sign language. The instructions also cause the first processing unit to determine, for each of the multiple sets of data, a plurality of attribute values defined by a customized template. The customized template uniformly defines a plurality of attributes for all sets of data captured by the one or more data acquisition devices including a first attribute that indicates a location of the shared memory for storage of the corresponding set of data and a second attribute that indicates when the corresponding gesture is captured. The instructions upon execution by a second processing unit of the plurality of processing units cause the second processing unit to access the multiple sets of data in the shared memory using the location indicated by the first attribute without copying the multiple sets of data to any other memory location.

In some embodiments, the customized template includes a third attribute of a storage type corresponding to the set of data, the storage type including one of: local CPU storage, local GPU storage, remote CPU storage, or remote GPU storage. In some embodiments, the first attribute includes an address value for storing the corresponding set of data. In some embodiments, the second attribute is represented by at least one of: a millisecond, a frame number, or a Society of Motion Picture and Television Engineers (SMPTE) timecode. In some embodiments, the customized template further comprises at least one of: a width of the image frame, a height of the image frame, or a color-space format in which the image frame is stored.

In some embodiments, the instructions upon execution by the first processing unit cause the first processing unit to store the customized templates of the plurality of sets of data to a data pool for facilitating subsequent processing of the plurality of sets of data including the image frames. In some embodiments, the data pool includes a data structure to organize the customized templates based on timestamps, each timestamp indicating when a corresponding set of data is captured.

In another example aspect, a method of managing data for a sign language translation system includes receiving multiple sets of data acquired by one or more data acquisition devices. Each set of data including an image frame that illustrates at least a part of a gesture, wherein the gesture represents a letter, a word, or a phrase in a sign language. The method includes determining, for each of the multiple sets of data, a plurality of attribute values defined by a customized template. The customized template uniformly defines a plurality of attributes for all sets of data captured by the one or more data acquisition devices including a first attribute that indicates a location of the shared memory for storage of the corresponding set of data and a second attribute that indicates when the corresponding gesture is captured. The method includes accessing the multiple sets of data, by a plurality of processing units, based on the location indicated by the first attribute for recognizing the at least a part of a gesture. The location allows at least one of the plurality of processing units to access the multiple sets of data in the shared memory without copying the multiple sets of data to any other memory location.

In some embodiments, the customized template includes a third attribute of a storage type corresponding to the set of data, the storage type including one of: local CPU storage, local GPU storage, remote CPU storage, or remote GPU storage. In some embodiments, the first attribute includes an address value for storing the corresponding set of data. In some embodiments, the second attribute is represented by at least one of: a millisecond, a frame number, or a Society of Motion Picture and Television Engineers (SMPTE) timecode. In some embodiments, the customized template further comprises at least one of: a width of the image frame, a height of the image frame, or a color-space format in which the image frame is stored.

In some embodiments, the method includes storing the customized templates of the plurality of sets of data to a data pool for facilitating subsequent processing of the plurality of sets of data including the image frames. In some embodiments, the data pool includes a data structure to organize the customized templates based on timestamps, each timestamp indicating when a corresponding set of data is captured.

In another example aspect, an apparatus in a sign language processing system includes a first processing unit and a second processing unit, and a memory including instructions stored thereupon. The instructions upon execution by the first processing unit cause the first processing unit to receive, by a first thread of a first processing unit, a set of data captured by a capture device, the set of data including an image frame that illustrates a gesture representing a letter, a word, or a phrase in a sign language. The instructions cause the first processing unit to eliminate, by the first thread of the first processing unit, background information in the image frame to obtain one or more areas of interest; prepare, by a second thread of the first processing unit concurrently as the set of data is preprocessed, a set of resources for a gesture recognition operation; invoke, by the second thread of the first processing unit, a first neural network to be executed on a second processing unit to carry out the gesture recognition operation on the one or more areas of interest using the set of resources; and receive, by the first thread of the first processing unit, a subsequent set of data captured by the capture device concurrently as the gesture recognition operation is performed. The instructions upon execution by the first or the second processing unit cause the first or the second process unit to determine a performance result of the gesture recognition operation, and dynamically adjust the set of resources for subsequent processing of data from the capture device to improve the performance result.

In some embodiments, the instructions upon execution by the second processing unit cause the second processing unit to dynamically adjust the set of resources using a second neural network by performing a machine learning procedure based on the performance result. In some embodiments, the performance result includes a utilization rate of the first or the second processing unit.

In some embodiments, the apparatus includes a third processing unit. The instructions upon execution by the first processing unit cause the first processing unit to receive, by a fourth thread of the first processing unit, a second set of data obtained from a second capture device. The second set of data includes a second image frame that illustrate the gesture. The instructions also cause the first processing unit to eliminate, by the fourth thread of the first processing unit, background information in the second image frame to obtain one or more areas of interest in the second image frame; prepare, by a fifth thread of the first processing unit concurrently as the second set of data is preprocessed, a second set of resources for the gesture recognition operation; invoke, by the fifth thread of the first processing unit, a third neural network to be executed on the third processing unit to carry out the gesture recognition operation on the one or more areas of interest in the second image frame using the second set of resources; and receive, by the fourth thread of the first processing unit, a subsequent set of data captured by the second capture device concurrently as the gesture recognition operation is being performed. In some embodiments, the second processing unit is same as the third processing unit.

In another example aspect, a method for improving computational efficiency of a computer system for use in a sign language translation system includes receiving, by a first thread of a first processing unit, a set of data captured by a capture device, the set of data including an image frame that illustrates a gesture representing a letter, a word, or a phrase in a sign language. The method includes eliminating, by the first thread of the first processing unit, background information from the image frame to obtain one or more areas of interest. The method includes preparing, by a second thread of the first processing unit concurrently as the set of data is preprocessed, a set of resources for a gesture recognition operation. The method includes invoking, by the second thread of the first processing unit, a first neural network to be executed on a second processing unit to carry out the gesture recognition operation on the one or more areas of interest using the set of resources. The method includes receiving, by the first thread of the first processing unit, a subsequent set of data captured by the capture device concurrently as the gesture recognition operation is being performed. The method includes determining a performance result of the gesture recognition operation. The method also includes dynamically adjusting the set of resources for subsequent processing of data from the capture device to improve the performance result.

In some embodiments, the set of resources is dynamically adjusted by a second neural network performing a machine learning procedure based on the performance result. In some embodiments, the performance result includes a utilization rate of the computer system.

In some embodiments, the method includes receiving, by a fourth thread of the first processing unit, a second set of data obtained from a second capture device, the second set of data including a second image frame that illustrate the gesture. The method includes eliminating, by the fourth thread of the first processing unit, background information in the second image frame to obtain one or more areas of interest in the second image frame. The method includes preparing, by a fifth thread of the first processing unit concurrently as the fourth thread obtains the second set of data, a second set of resources for the gesture recognition operation. The method includes invoking, by the fifth thread of the first processing unit, a third neural network to be executed on a third processing unit to carry out the gesture recognition operation on the one or more areas of interest in the second image frame using the second set of resources. The method also includes receiving, by the fourth thread of the first processing unit, a subsequent set of data captured by the second capture device concurrently as the gesture recognition operation is being performed. In some embodiments, the second processing unit is same as the third processing unit.

In yet another example aspect, an apparatus of a pattern recognition system a first processing unit and a second processing unit, a shared memory accessible to at least the second processing unit, and a non-transitory memory including instructions stored thereupon. The instructions upon execution by the first processing unit cause the first processing unit to receive, by a first thread of the first processing unit, a set of data captured by a capture device, and determine, by a second thread of the first processing unit, a plurality of attribute values defined by a customized template. The customized template uniformly defines a plurality of attributes for all sets of data captured by the one or more data acquisition devices including a first attribute that indicates a location of the shared memory for storage of the set of data and a second attribute that indicates when the corresponding gesture is captured. The instructions upon execution by the second processing unit cause the second processing unit to execute a first neural network to carry out a recognition operation using a set of resources. The instructions upon execution by the first or the second processing unit cause the first processing unit or the second processing unit to dynamically adjust the set of resources for subsequent processing of data from the capture device to improve a system unitization rate.

In some embodiments, the apparatus includes a third processing unit. The instructions upon execution by the third processing unit cause the third processing unit to access the set of data in the shared memory using the location indicated by the first attribute without copying the set of data to any other memory location.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical discs. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a," "an" and "the" are intended to include the plural forms as well, unless the context clearly indicates otherwise. Additionally, the use of "or" is intended to include "and/or," unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. An apparatus in a sign language processing system, comprising:
   a first processing unit and a second processing unit, and
   a memory including instructions stored thereupon, the instructions upon execution by the first processing unit causing the first processing unit to:
      receive, by a first thread of a first processing unit, a set of data captured by a capture device, the set of data including an image frame that illustrates a gesture representing a letter, a word, or a phrase in a sign language;
      eliminate, by the first thread of the first processing unit, background information in the image frame to obtain one or more areas of interest;
      prepare, by a second thread of the first processing unit concurrently as the set of data is preprocessed, a set of resources for a gesture recognition operation;
      invoke, by the second thread of the first processing unit, a first neural network to be executed on a second processing unit to carry out the gesture recognition operation on the one or more areas of interest using the set of resources; and
      receive, by the first thread of the first processing unit, a subsequent set of data captured by the capture device, the subsequent set of data received concurrently as the gesture recognition operation is being performed,
   wherein the instructions upon execution by the first or the second processing unit cause the first or the second processing unit to:
      determine a performance result of the gesture recognition operation; and
      dynamically adjust the set of resources for subsequent processing of data from the capture device to improve the performance result that includes a utilization rate of the first or the second processing unit, and
   wherein the instructions upon execution by the second processing unit cause the second processing unit to dynamically adjust the set of resources using a second neural network by performing a machine learning procedure based on the performance result.

2. The apparatus of claim 1, comprising a third processing unit, and wherein the instructions upon execution by the first processing unit cause the first processing unit to:
   receive, by a fourth thread of the first processing unit, a second set of data obtained from a second capture device, the second set of data including a second image frame that illustrates the gesture;
   eliminate, by the fourth thread of the first processing unit, background information in the second image frame to obtain one or more areas of interest in the second image frame;
   prepare, by a fifth thread of the first processing unit concurrently as the second set of data is preprocessed, a second set of resources for the gesture recognition operation;
   invoke, by the fifth thread of the first processing unit, a third neural network to be executed on the third processing unit to carry out the gesture recognition operation on the one or more areas of interest in the second image frame using the second set of resources; and
   receive, by the fourth thread of the first processing unit, a subsequent set of data captured by the second capture device concurrently as the gesture recognition operation is being performed.

3. The apparatus of claim 2, wherein the second processing unit is same as the third processing unit.

4. A method for improving computational efficiency of a computer system for use in a sign language translation system, comprising:
- receiving, by a first thread of a first processing unit, a set of data captured by a capture device, the set of data including an image frame that illustrates a gesture representing a letter, a word, or a phrase in a sign language;
- eliminating, by the first thread of the first processing unit, background information from the image frame to obtain one or more areas of interest;
- preparing, by a second thread of the first processing unit concurrently as the set of data is preprocessed, a set of resources for a gesture recognition operation;
- invoking, by the second thread of the first processing unit, a first neural network to be executed on a second processing unit to carry out the gesture recognition operation on the one or more areas of interest using the set of resources;
- receiving, by the first thread of the first processing unit, a subsequent set of data captured by the capture device concurrently as the gesture recognition operation is being performed;
- determining a performance result of the gesture recognition operation, the performance result including a utilization rate of the computer system; and
- dynamically adjusting the set of resources for subsequent processing of data from the capture device to improve the performance result, wherein the set of resources is dynamically adjusted by a second neural network performing a machine learning procedure based on the performance result.

5. The method of claim 4, comprising:
- receiving, by a fourth thread of the first processing unit, a second set of data obtained from a second capture device, the second set of data including a second image frame that illustrates the gesture;
- eliminating, by the fourth thread of the first processing unit, background information in the second image frame to obtain one or more areas of interest in the second image frame;
- preparing, by a fifth thread of the first processing unit concurrently as the fourth thread obtains the second set of data, a second set of resources for the gesture recognition operation;
- invoking, by the fifth thread of the first processing unit, a third neural network to be executed on a third processing unit to carry out the gesture recognition operation on the one or more areas of interest in the second image frame using the second set of resources; and
- receiving, by the fourth thread of the first processing unit, a subsequent set of data captured by the second capture device concurrently as the gesture recognition operation is being performed.

6. The method of claim 5, wherein the second processing unit is same as the third processing unit.

* * * * *